United States Patent
Kulus et al.

(10) Patent No.: US 10,359,911 B2
(45) Date of Patent: Jul. 23, 2019

(54) APPARATUS AND METHOD FOR DYNAMIC DEVICE DESCRIPTION LANGUAGE MENUS

(71) Applicant: FISHER-ROSEMOUNT SYSTEMS, INC., Round Rock, TX (US)

(72) Inventors: Christian James Kulus, St Paul, MN (US); Walter Hendrik Sigtermans, Apple Valley, MN (US); Thanh Ngan Truong, Lakeville, MN (US); Katie Grams Frost, Plymouth, MN (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 348 days.

(21) Appl. No.: 15/299,679

(22) Filed: Oct. 21, 2016

(65) Prior Publication Data
US 2018/0113573 A1    Apr. 26, 2018

(51) Int. Cl.
 *G05B 23/02* (2006.01)
 *G06F 17/24* (2006.01)
 (Continued)

(52) U.S. Cl.
 CPC ......... *G06F 3/0482* (2013.01); *G05B 19/409* (2013.01); *G05B 23/0216* (2013.01);
 (Continued)

(58) Field of Classification Search
CPC .. G06F 3/0482; G06F 3/04847; G06F 17/248; G05B 19/409; G05B 2219/32128;
(Continued)

(56) References Cited

U.S. PATENT DOCUMENTS 5,251,125 A * 10/1993 Karnowski .......... G05B 19/106
  345/172
7,665,028 B2 * 2/2010 Cummins ............. G06F 3/0486
  715/769
(Continued)

FOREIGN PATENT DOCUMENTS

GB    2 513 706 A    11/2014

OTHER PUBLICATIONS

Wolfgang Kastner et al., "EDDL inside FDT/DTM," 2004 [retrieved on Feb. 26, 2019], IEEE International Workshop on Factory Communication Systems, pp. 365-368, downloaded from the Internet at <url>:https://ieeexplore.ieee.org. (Year: 2004).*
(Continued)

*Primary Examiner* — Thuy Dao
*Assistant Examiner* — Stephen D Berman
(74) *Attorney, Agent, or Firm* — Marshall, Gerstein & Borun LLP

(57) ABSTRACT

A method and system configures a Device Description Language (DDL) interface on a DDL-based host system in a process plant. Using a device description identification, the system and method updates the host system with the device description for a selected process control device. The device description includes menus for the selected process control device. The method and system expose the DDL menu constructs from the device description to the host system, such that the host system is able to present the DDL constructs as user-selectable elements in a configuration interface, where DDL constructs may be added, deleted and/or modified to create a DDL interface independent of the menu for the process control device as provided in the device description.

35 Claims, 16 Drawing Sheets

(51) Int. Cl.
*G05B 19/409* (2006.01)
*G06F 3/0482* (2013.01)
*G06F 3/0484* (2013.01)

(52) U.S. Cl.
CPC .............. *G06F 3/04847* (2013.01); *G05B 2219/32128* (2013.01); *G05B 2219/32144* (2013.01); *G05B 2219/36169* (2013.01); *G06F 17/248* (2013.01)

(58) Field of Classification Search
CPC .......... G05B 2219/32144; G05B 2219/36169; G05B 23/0216
See application file for complete search history.

(56) References Cited

U.S. PATENT DOCUMENTS

| | | | | |
|---|---|---|---|---|
| 2007/0132779 | A1* | 6/2007 | Gilbert | G06F 9/4488 345/619 |
| 2007/0162853 | A1* | 7/2007 | Weber | G06F 3/0482 715/719 |
| 2010/0188410 | A1 | 7/2010 | Gilbert et al. | |
| 2011/0231531 | A1* | 9/2011 | De Groot | G05B 19/0426 709/221 |
| 2012/0054599 | A1 | 3/2012 | Nixon et al. | |
| 2012/0062577 | A1 | 3/2012 | Nixon | |
| 2012/0185065 | A1 | 7/2012 | Fujii | |
| 2012/0254339 | A1 | 10/2012 | Holmes | |
| 2013/0130653 | A1* | 5/2013 | Deasy | H04W 76/10 455/411 |
| 2016/0103928 | A1* | 4/2016 | Glasgow | G06F 3/04847 715/234 |
| 2016/0132046 | A1* | 5/2016 | Beoughter | G05B 19/4184 700/17 |

OTHER PUBLICATIONS

Fabrizio Lamberti et al., "Extensible GUIs for Remote Application Control on Mobile Devices," 2008 [retrieved on Feb. 26, 2019], IEEE Computer Graphics and Applications, vol. 28, Issue 4, pp. 50-57, downloaded from the Internet at <url>:https://ieeexplore.ieee.org. (Year: 2008).*

Rodrigo Pantoni et al., "Developing and implementing an open and non-proprietary device description for Foundation fieldbus based on software standards," 2008 [retrieved on Feb. 26, 2019], Computer Standards & Interfaces, vol. 31, Issue 2, pp. 504-514, downloaded at <url>https://www.sciencedirect.com. (Year: 2008).*

Search Report for Application No. GB1717314.7, dated Feb. 28, 2018.

* cited by examiner

APPARATUS AND METHOD FOR DYNAMIC DEVICE DESCRIPTION LANGUAGE MENUS

FIELD OF THE TECHNOLOGY

The present disclosure relates generally to process control systems within process plants and, more particularly, to dynamically creating and modifying Device Description Language menus.

BACKGROUND

Process control systems are widely used in factories and/or plants in which products are manufactured or processes are controlled (e.g., chemical manufacturing, power plant control, etc.). Process control systems are also used in the harvesting of natural resources such as, for example, oil and gas drilling and handling processes, etc. In fact, virtually any manufacturing process, resource harvesting process, etc. can be automated through the application of one or more process control systems. It is believed the process control systems will eventually be used more extensively in agriculture as well.

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

The various devices within the process plant may be interconnected in physical and/or logical groups to create a logical process, such as a control loop. Likewise, a control loop may be interconnected with other control loops and/or devices to create sub-units. A sub-unit may be interconnected with other sub-units to create a unit, which in turn, may be interconnected with other units to create an area. Process plants generally include interconnected areas, and business entities generally include process plants which may be interconnected. As a result, a process plant includes numerous levels of hierarchy having interconnected assets, and a business enterprise may include interconnected process plants. In other words, assets related to a process plant, or process plants themselves, may be grouped together to form assets at higher levels.

The manner in which process control systems are implemented has evolved over the years. Older generations of process control systems were typically implemented using dedicated, centralized hardware and hard-wired connections.

However, modern process control systems are typically implemented using a highly distributed network of workstations, intelligent controllers, smart field devices, and the like, some or all of which may perform a portion of an overall process control strategy or scheme. In particular, most modern process control systems include smart field devices and other process control components that are communicatively coupled to each other and/or to one or more process controllers via one or more digital data buses. In addition to smart field devices, modern process control systems may also include analog field devices such as, for example, 4-20 milliamp (mA) devices, 0-10 volts direct current (VDC) devices, etc., which are typically directly coupled to controllers as opposed to a shared digital data bus or the like.

In a typical industrial or process plant, a distributed control system (DCS) is used to control many of the industrial processes performed at the plant. The plant may have a centralized control room having a computer system with user input/output (I/O), a disc I/O, and other peripherals known in the computing art with one or more process controllers and process I/O subsystems communicatively connected to the centralized control room. Additionally, one or more field devices are typically connected to the I/O subsystems and to the process controllers to implement control and measurement activities within the plant. While the process I/O subsystem may include a plurality of I/O ports connected to the various field devices throughout the plant, the field devices may include various types of analytical equipment, silicon pressure sensors, capacitive pressure sensors, resistive temperature detectors, thermocouples, strain gauges, limit switches, on/off switches, flow transmitters, pressure transmitters, capacitance level switches, weigh scales, transducers, valve positioners, valve controllers, actuators, solenoids, indicator lights or any other device typically used in process plants.

As used herein, the term "field device" encompasses these devices, as well as any other device that performs a function in a control system. In any event, field devices may include, for example, input devices (e.g., devices such as sensors that provide status signals that are indicative of process control parameters such as, for example, temperature, pressure, flow rate, etc.), as well as control operators or actuators that perform actions in response to commands received from controllers and/or other field devices.

Traditionally, analog field devices have been connected to the controller by two-wire twisted pair current loops, with each device connected to the controller by a single two-wire twisted pair. Analog field devices are capable of responding to or transmitting an electrical signal within a specified range. In a typical configuration, it is common to have a voltage differential of approximately 20-25 volts between the two wires of the pair and a current of 4-20 mA running through the loop. An analog field device that transmits a signal to the control room modulates the current running through the current loop, with the current being proportional to the sensed process variable.

An analog field device that performs an action under control of the control room is controlled by the magnitude of the current through the loop, which current is modulated by the I/O port of the process I/O system, which in turn is controlled by the controller. Traditional two-wire analog devices having active electronics can also receive up to 40 milliwatts of power from the loop. Analog field devices requiring more power are typically connected to the controller using four wires, with two of the wires delivering power to the device. Such devices are known in the art as four-wire devices and are not power limited, as typically are two-wire devices.

A discrete field device can transmit or respond to a binary signal. Typically, discrete field devices operate with a 24 volt signal (either AC or DC), a 110 or 240 volt AC signal, or a 5 volt DC signal. Of course, a discrete device may be designed to operate in accordance with any electrical specification required by a particular control environment. A discrete input field device is simply a switch which either makes or breaks the connection to the controller, while a discrete output field device will take an action based on the presence or absence of a signal from the controller.

Historically, most traditional field devices have had either a single input or a single output that was directly related to the primary function performed by the field device. For example, the only function implemented by a traditional analog resistive temperature sensor is to transmit a temperature by modulating the current flowing through the two-wire twisted pair, while the only function implemented by a traditional analog valve positioner is to position a valve somewhere between a fully open and a fully closed position based on the magnitude of the current flowing through the two-wire twisted pair.

More recently, field devices that are part of hybrid systems become available that superimpose digital data on the current loop used to transmit analog signals. One such hybrid system is known in the control art as the Highway Addressable Remote Transducer (HART) protocol. The HART system uses the magnitude of the current in the current loop to send an analog control signal or to receive a sensed process variable (as in the traditional system), but also superimposes a digital carrier signal upon the current loop signal. The HART protocol makes use of the Bell 202 Frequency Shift Keying (FSK) standard to superimpose the digital signals at a low level on top of the 4-20 mA analog signals. This enables two-way field communication to take place and makes it possible for additional information beyond just the normal process variable to be communicated to/from a smart field instrument. The HART protocol communicates at 1200 bps without interrupting the 4-20 mA signal and allows a host application (master) to get two or more digital updates per second from a field device. As the digital FSK signal is phase continuous, there is no interference with the 4-20 mA signal.

The FSK signal is relatively slow and can therefore provide updates of a secondary process variable or other parameter at a rate of approximately 2-3 updates per second. Generally, the digital carrier signal is used to send secondary and diagnostic information and is not used to realize the primary control function of the field device. Examples of information provided over the digital carrier signal include secondary process variables, diagnostic information (including sensor diagnostics, device diagnostics, wiring diagnostics, and process diagnostics), operating temperatures, a sensor temperature, calibration information, device ID numbers, materials of construction, configuration or programming information, etc. Accordingly, a single hybrid field device may have a variety of input and output variables and may implement a variety of functions.

More recently, a newer control protocol has been defined by the Instrument Society of America (ISA). The new protocol is generally referred to as Fieldbus, and is specifically referred to as SP50, which is as acronym for Standards and Practice Subcommittee 50. The Fieldbus protocol defines two subprotocols. An H1 Fieldbus network transmits data at a rate up to 31.25 kilobits per second and provides power to field devices coupled to the network. An H2 Fieldbus network transmits data at a rate up to 2.5 megabits per second, does not provide power to field devices connected to the network, and is provided with redundant transmission media. Fieldbus is a nonproprietary open standard and is now prevalent in the industry and, as such, many types of Fieldbus devices have been developed and are in use in process plants. Because Fieldbus devices are used in addition to other types of field devices, such as HART and 4-20 mA devices, with a separate support and I/O communication structure associated with each of these different types of devices.

Newer smart field devices, which are typically all digital in nature, have maintenance modes and enhanced functions that are not accessible from or compatible with older control systems. Even when all components of a distributed control system adhere to the same standard (such as the Fieldbus standard), one manufacturer's control equipment may not be able to access the secondary functions or secondary information provided by another manufacturer's field devices.

Typically, the communication protocols defined by these foundations include standards that specify how each device identifies itself and communicates with a process control system through the use of what is known as a device description (DD), where the DD defines the protocol's application layer and various user interface definitions necessary to communicate with the device. The DD is written in the well-known and well-supported Device Description Language (DDL) (also known as electronic Device Description Language (EDDL)), established as an International Electrotechnical Commission standard (e.g., IEC 61804). Each device type typically has its own DD, which is a formal description of the data and operating procedures for a field device, including variables, data (parameters), communication (addressing information), methods, commands/operations (e.g., calibration), and graphical user interfaces (e.g., menus and display formats) associated with various features of the device. Information about every accessible variable of the device is generally included in the device description to thereby define the compatibility of, and possible communications with, the device. Such variables include, for example, process measurements, any derived values, and all the internal parameters of the device such as range, sensor type, choice of linearization, materials of construction, manufacturer, revision number, etc. The DDL instructs the host system or host application how to communicate, decode, and display the information in the DD for the device.

The DDs for various devices are typically used in a number of different manners. For example, when a process application or host application is implemented in a process plant, the maintenance personnel responsible for maintaining the process application may need to get help information about various parameters of various devices. Similarly, system designers writing a process application may use a DD to gain further information about a device. Device manufacturers generally provide DDs on a computer readable media so that these DDs can be easily copied into various process control system computers or into various process plant related applications. In particular, device manufacturers typically provide a DD for each device they make which defines, in the DDL, the parameters associated with the device, how to communicate with the device, limits for the device, etc.

DDL-based hosts can read and interpret the DD for a device in the DDL to determine the type of device and the important parameters, limits, etc. associated with the device that a DD developer (e.g., device manufacturer, protocol foundation) thinks are important for the user to see. As such, the DDL constructs (such as variables, methods, commands, menus and display formats, such as images, graphs, grids, waveforms and charts) are interpreted by the DDL-based host or host application and displayed to the user. The DDL-based host can define the parameters, limits, etc. associated with the device as the intrinsic properties or parameters of the graphic element for the device. The DDL-based host may also have programs to select or define visualizations for the device, and may select one or more generic scripts to use for providing basic actions and animations for the device, either based on information from the DD or based on templates stored for the device type defined by the DD for the device. Resource files may also be used to translate the DDL information into a display. However, the resource files are typically designed by the DD developer, in which case the display, although somewhat configurable to define visualizations and animations for the device, is generally static when it comes to the display of information, and the user is bound to view the information specified by the resource file of the developer. As such, the user is not in control of the information he/she views and/or the manner in which the information is viewed. In terms of the graphical user interface for the device as specified by the DD, the user may be required to iterate through multiple menus in order to retrieve the information deemed important by the user.

SUMMARY

A Device Description Language (DDL) menu configuration system and method enables a user to configure and maintain DDL menus in order to view information deemed important to the user, rather than view information based on resource files provided by the device description developer. The user is able to select process devices, and select menu elements related those process devices, to add to the DDL menu, including menu elements from different device descriptions for different process devices, even if the device descriptions are from different developers (e.g., different process device manufacturers). The menus may be saved on a DDL host, and activated by the user on demand to view the information on the menu. A user is also able to reconfigure the menu with new menu elements.

The system and method disclosed herein updates a DDL host with a device description for a process control device as selected by the user. The device description includes, among other items, menus and/or display formats for viewing information about the process control device. DDL menu constructs from the device description are exposed from the device description and displayed in a configuration interface so that the user is able to select DDL menu constructs that are important to the user. The user may then add and configure the DDL menu constructs to the DDL menu so as to configure the DDL menu according to the user's preferences. The DDL menus are mapped to the various DDL menu constructs the user is interested in observing. The DDL menu is maintained by the DDL host, such that the user may activate or deactivate DDL menus upon demand, and reconfigure the DDL menu by adding new DDL menu constructs, modifying DDL menu constructs within the DDL menu or deleting DDL menu constructs from the DDL menu.

DETAILED DESCRIPTION

Figure 1:
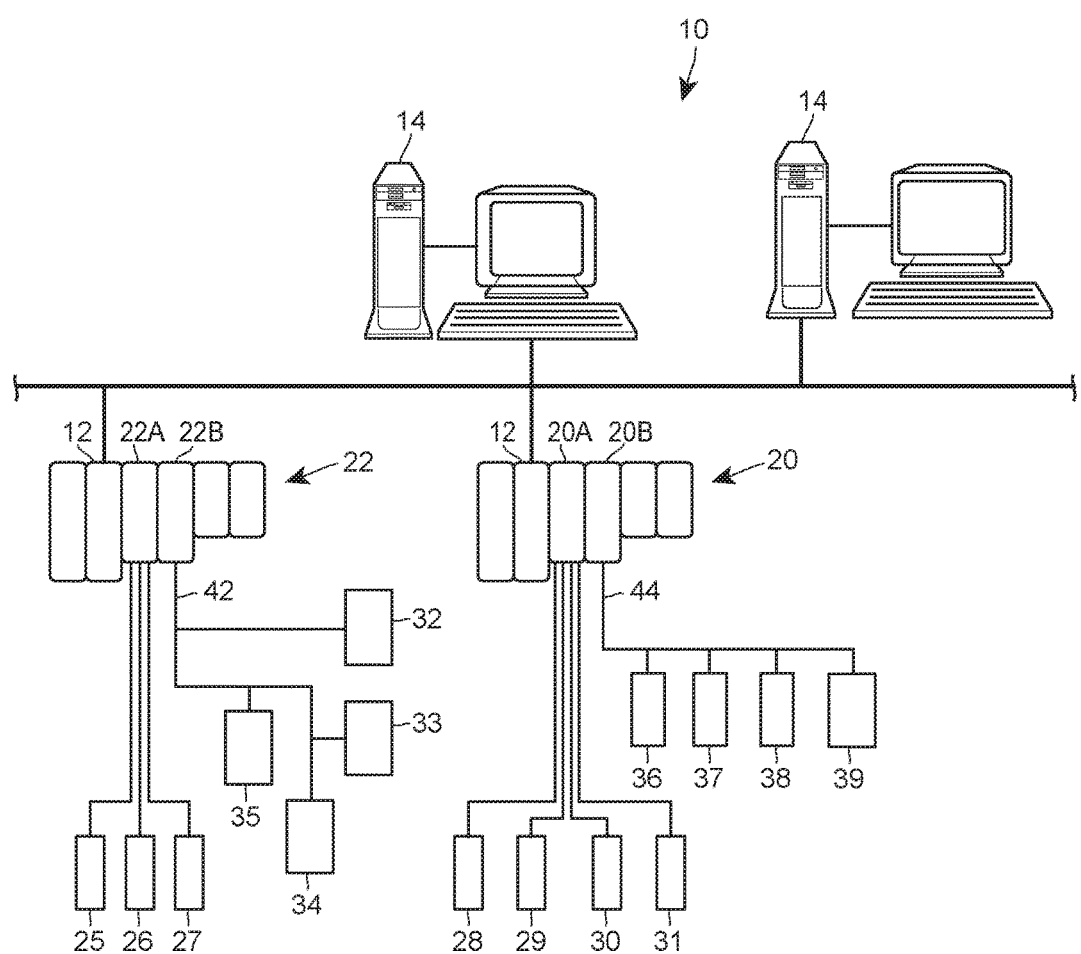
FIG. 1 is a combined block and schematic diagram of a distributed process control system in accordance with this disclosure.

Referring now to FIG. 1, a hardwired distributed process control system 10 includes one or more process controllers 12 connected to one or more host workstations or computers 14 (which may be any type of personal computer or workstation). The process controllers 12 are also connected to banks of input/output (I/O) devices 20, 22 each of which, in turn, is connected to one or more field devices 25-39. The controllers 12, which may be, by way of example only, DeltaV™ controllers sold by Fisher-Rosemount Systems, Inc., are communicatively connected to the host computers 14 via, for example, an Ethernet connection 40 or other communication link. Likewise, the controllers 12 are communicatively connected to the field devices 25-39 using any desired hardware and software associated with, for example, standard 4-20 ma devices and/or any smart communication protocol such as the Fieldbus or HART protocols. As is generally known, the controllers 12 implement or oversee process control routines stored therein or otherwise associated therewith and communicate with the devices 25-39 to control a process in any desired manner.

The field devices 25-39 may be any types of devices, such as sensors, valves, transmitters, positioners, etc. while the I/O cards within the banks 20 and 22 may be any types of I/O devices conforming to any desired communication or controller protocol such as HART, Fieldbus, Profibus, etc. In the embodiment illustrated in FIG. 1, the field devices 25-27 are standard 4-20 mA devices that communicate over analog lines to the I/O card 22A. The field devices 28-31 are illustrated as HART devices connected to a HART compatible I/O device 20A. Similarly, the field devices 32-39 are smart devices, such as Fieldbus field devices, that communicate over a digital bus 42 or 44 to the I/O cards 20B or 22B using, for example, Fieldbus protocol communications. Of course, the field devices 25-39 and the banks of I/O cards 20 and 22 could conform to any other desired standard(s) or protocols besides the 4-20 mA, HART or Fieldbus protocols, including any standards or protocols developed in the future.

Each of the controllers 12 is configured to implement a control strategy using what are commonly referred to as function blocks, wherein each function block is a part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process control system 10. Of course hybrid and other types of function blocks exist. Groups of these function blocks are called modules. Function blocks and modules may be stored in and executed by the controller 12, which is typically the case when these function blocks are used for, or are associated with standard 4-20 mA devices and some types of smart field devices, or may be stored in and implemented by the field devices themselves, which may be the case with Fieldbus devices. While the control system 10 illustrated in FIG. 1 is described as using function block control-strategy, the control strategy could also be implemented, or designed using other conventions, such as ladder logic, sequential flow charts, etc. and using any desired proprietary or nonproprietary programming language.

Still further, in a known manner, one or more of the workstations 14 may include user interface applications to enable a user, such as an operator, a configuration engineer, a maintenance person, etc. to interface with the process control network 10 within the plant. In particular, the workstation 14 may include one or more user interface applications which may be executed on a processor within the workstation 14 to communicate with a database, the control modules or other routines within the controllers 12 or I/O banks 20, 22, with the field devices 25-39 and the modules within these field devices, etc. to obtain information from the plant, such as information related to the ongoing state of the process control system 10. The user interface applications may process and/or display this collected information on a display device associated with one or more of the workstations 14. The collected, processed and/or displayed information may be, for example, process state information, alarms and alerts generated within plant, maintenance data, etc. Likewise, one or more applications may be stored in an executed in the workstations 14 to perform configuration activities such as creating or configuring the modules to be executed within the plant, to perform control operator activities, such as changing setpoints or other control variables, within the plant, etc. Of course the number and type of routines is not limited by the description provided herein and other numbers and types of process control related routines may be stored in an implemented within the workstations 14 if desired. The workstations 14 may also be connected via, for example, the internet, extranet, bus, Ethernet 40, etc., to a corporate WAN as well as to a computer system that enables remote monitoring of or communication with the plant 10 from remote locations.

As evident from the discussion of FIG. 1, the communications between the host workstations 14 and the controllers 12 and between the controllers 12 and the field devices 25-39 are implemented with hardwired communication connections, including one or more of HART, Fieldbus and 4-20 mA hardwired communication connections. However, as noted above, the hardwired communication connections may be replaced or augmented within the process environment of FIG. 1 with wireless communications in an manner that is reliable, that is easy to set up and configure, that provides an operator or other user with the ability to analyze or view the functioning capabilities of the wireless network, etc.

For example, wireless networks may be deployed throughout the process control system. As a result, some or all of the I/O devices within a process control system, such as sensors and actuators, may be deployed and communicatively coupled to the process control system using hardwired technologies, wireless technologies or combination thereof. For example, hardwired communications may be maintained between and among some of the controllers 12, the workstations 14, and the field devices 25-31, whereas wireless communications may be established between and among others of the controllers 12, the workstations 14, and field devices 32-39. Wireless technologies may include, but are not limited to, ZigBee, WiFi, Bluetooth, Ultra Wideband (UWB), etc., or any other short-range wireless technology, as well as satellite, Wi-Max, and other long-range wireless transmission. In particular, wireless technologies may include any commercial off-the-shelf wireless products to transmit process control data. A network protocol may be implemented on top of the wireless technology, or a new process control standard may be developed for wireless communication.

Figure 2:
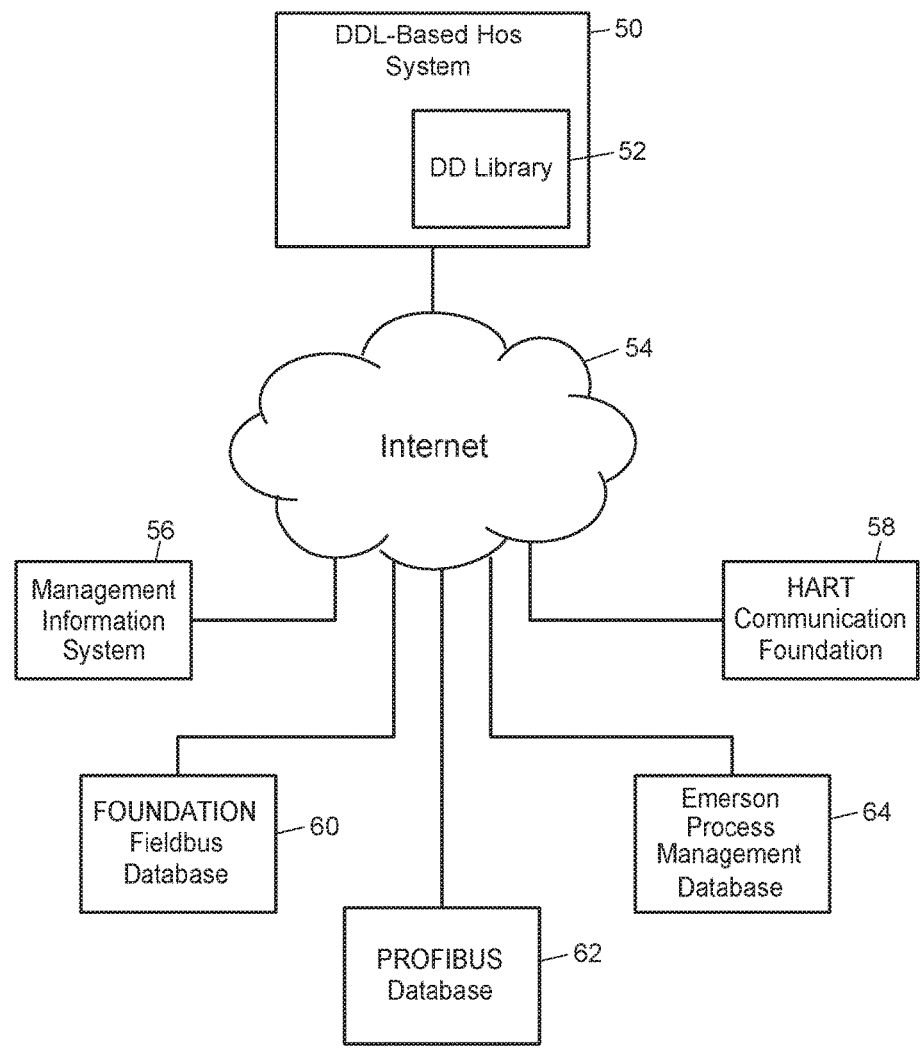
FIG. 2 is a block diagram of a DDL-based host system of a distributed process control system networked with various databases via the Internet in accordance with this disclosure.

Referring to FIG. 2, a DDL-based host system 50, which may be part of the process control system 10, and, more particularly, a workstation 14, may include a number of host applications for monitoring and operating the process control system 10, and, more particularly, the field devices 25-39. For example, the host system 50 may include host applications for process control, simulation, maintenance, diagnostics, configuration, etc. The host system 50 (or each host application) may also have a local library or database 52 storing the device description (DD) of one or more of the field devices 25-39. As shown in FIG. 2, the host system 50 is connected to the Internet 54, which may be either a direct connection or an indirect connection (e.g., via the Ethernet 40). In an alternative embodiment, the Internet 54 may be replaced, in all or part, with a corporate WAN.

As shown in FIG. 2, the host system 50 is communicatively coupled via the Internet 54 to a number of databases or systems, each of which may communicate with the process control system 10. For example, a management information system 56 may collect various information from the process control system 10, including, but not limited to, inputs, production, etc. Various DD databases, such as a HART communication foundation database 58, a FOUNDATION Fieldbus database 60, a PROFIBUS (Process Field Bus) database 62, a device manufacturer database, such as an Emerson Process Management database 64, etc. may likewise be communicatively coupled to the host system 50 via the Internet 54. The databases 56, 58, 60, 62, 64 may contain information about various devices used in the process control system 10, including device descriptions for the devices. For example, the HART communication foundation database 58 may contain device descriptions for various HART devices used in the process control system 10, the FOUNDATION Fieldbus database 60 may contain device descriptions for various Fieldbus devices used in the process control system 10, and the PROFIBUS database 62 may contain device descriptions for various PROFIBUS devices used in the process control system 10. The device descriptions may also be stored in various databases provided by different manufacturers, such as the Emerson Process Management database 64, for various devices used in the process control system 10 from that device manufacturer.

As mentioned above, a device description is a formal description of the data and operating procedures for a type of field device, including variables, data (parameters), communication (addressing information), methods, commands/operations (e.g., calibration), and graphical user interfaces (e.g., menus and display formats) associated with various features of the device, and is written in the well-known and well-supported Device Description Language (DDL) by the device manufacturer or DD developer. For example, International Electrotechnical Commission (IEC) standard IEC 61804-3:2010(E) specifies the Electronic Device Description Language (EDDL) as a generic language for describing the properties of field devices, such as device parameters and dependencies, device functions (e.g., simulation mode, calibration, etc.), graphical representations (e.g., menus, enhanced user interfaces, etc.), interactions with control devices, graphing systems and persistent data store. Typically, the device description is provided as an electronic data file, such as a text file with a ".DDL" extension, prepared in accordance with the Device Description Language specification that describes the specific features and functions of the device, including details of menus and graphical display features to be used by the DDL-based host system 50 to access all parameters and data in the corresponding field device. Generally speaking, the device description is a series of compound statements using the format of an identifying word and a name, and includes every accessible variable for a device, such as process measurements, derived values, and internal parameters such as range, sensor type, materials of constructions, etc. For example, statements for the device description generally include, but are not limited to, VARIABLEs, MENUs, COMMANDs and METHODs, each of which has its own structured information.

A VARIABLE may be any value or data type (e.g., integer, floating point, alphanumeric, etc.) contained in the field device or used by the host system 50 to interact with the field device (e.g., pressure in a pressure transmitter, upper and lower range limits, device tag, etc.). The structured information for a VARIABLE may further specify how the VARIABLE is to be displayed (e.g., variable name), associated devices, help files, etc. For each COMMAND, the device description specifies the data structure for almost everything related to the command (e.g., request, response, status, response meaning, etc.) A COMMAND statement is provided for every command recognized by the device. A METHOD is a set of operations for the host to perform on the device (e.g., installation, calibration, commands, etc.). An operator may invoke a METHOD through, for example, a MENU option presented via the host, with the set of operations executed in the order in which the operations are written. A MENU is a presentation to the end user. It can be used to present VARIABLEs, information or other MENUs to the operator.

The DDL-based host 50 includes a configuration interface that allows an end-user at a process plant, such as the operator, to configure a DDL graphical user interface using information from the DD for each device selected by the user, such that the host 50 may dynamically create and maintain customized menus based on MENU constructs within the DD. In particular, the user interface enables the user in selecting DDL constructs for the customized DDL graphical user interface by exposing the DDL constructs from the DD to the host 50 and clearly explaining/presenting the DDL constructs, as well as any dependencies that may be encountered. Selected DDL constructs, and particularly menu constructs, may be added to a DDL graphical user interface such that the DDL graphical user interface is mapped to the selected DDL constructs, with the configured DDL graphical user interface (customized menu) being stored and retrieved at any time. The configured DDL graphical user interface may be activated by the user in order to view data presented via the DDL graphical user interface, hidden from view, reconfigured with new or additional DDL constructs, reconfigured with DDL constructs for a new or additional device (i.e., additional DDs), reconfigured by modifying existing DDL constructs within the DDL graphical user interface, etc. Thus, the user may customize menus based on information deemed most important to the user, as opposed to having manufacturer-designed or DD developer-designed menus forced upon the user. The DDL-based host 50 maintains the integrity of the DDL construct information, and issues the commands needed to acquire the DDL construct data values.

Generally speaking, the configuration, storage and retrieval of DDL graphical user interfaces may be accomplished by using DDL conditionals, FILE data and LOCAL variables. DDL conditionals are well-understood in the industry as involving child objects dependent upon a variable. Given that internal dependencies, such as dependencies between variables or parameters, may be complex, the DDL conditional is logic that handles those dependencies. In particular, the use of DDL conditionals allows the configuration interface to display not only the DDL constructs available for selection or input, but also any dependencies that might be encountered in selecting a construct or providing an input. In a similar manner, the DDL conditionals may cause the configuration interface to "hide" DDL constructs that are not relevant to the selected construct or input. The use of the term "hide" is well-understood to mean either hiding the DDL constructs from view, preventing the DDL constructs from being selected or from having inputs entered (e.g., greying out menu constructs). For example, if the user selects a device parameter (e.g., temperature), the configuration interface may "hide" all information, icons, variables, etc. unrelated to that parameter, leaving only the DDL constructs relevant to that selection (e.g., temperature settings, temperature unit options, etc.). As such, DDL conditionals cause the configuration interface to provide only DDL constructs that are valid or relevant for the prior-selected DDL construct, and use of the prior-selected DDL construct in the DDL graphical user interface may be conditioned upon selecting one or more of those DDL constructs. These DDL conditionals may also be utilized to aid the user in configuring a menu given the sometimes vast number of DDL constructs and dependencies that exist.

The user's preferences for the user configured DDL graphical user interface (e.g., selected DDL menu constructs, values, etc.) may be stored as a DDL file data structure referred to as FILE data, where the values of certain variables may be stored in the user's database. These variables are referred to as LOCAL variables, the values of which do not need to be stored in the device firmware, unlike for other DDL variables (i.e., device variable values) which are stored in the device firmware. Storing the preferences as FILE data allows for DDL graphical user interfaces with no changes to existing firmware, as the FILE data does not require any additional work on the device itself. That is, the configuration of a DDL graphical user interface are made outside the device at the DDL-based host 50 in the DDL. To this end, the LOCAL variables are not stored in the device, but are rather stored as DDL FILE data. The DDL FILE data thus acts as a local resource file that maps the DDL graphical user interface to the DDL menu constructs added to the DDL graphical user interface. When the DDL graphical user interface is activated, the DDL-based host (or DDL-based host application), utilizes the FILE data to translate the DDL information (e.g., the DDL menu constructs, variable values, etc.) into a display.

A partial pseudo-code example of DDL for a DDL graphical user interface utilizing FILE data is provided as follows, including a Variable and a Menu to view the Variable:

```
FILE user_configuration
{
  configure_param1   //user preference is stored in the users database
  configure_param2
  configure_param3
}
MENU process_variables_root_menu
{
  LABEL "Process Variables";   // title of the screen (group boxes, pages)
                               can be user-definable
  STYLE WINDOW;
  ITEMS
  {
    switch( configure_param1 )  // user preference is used to determine
                                the screen layout
    {
      case 0:
        gauge_showing_pressure
        break;
      case 1:
        sweep_chart_plotting_pressure
        break;
      default:
        pressure_value_as_text,
        COLUMNBREAK,
        pressure_upper_range_value,
        COLUMNBREAK,
        pressure_lower_range_value
        break;
    }
  }
}
VARIABLE configure_param1
{
  LABEL "Process Variables First Item"
  CLASS LOCAL;
  DEFAULT 0;
```

-continued

```
  TYPE ENUMERATION;
  ITEMS
  {
    0, "Gauge of PV";
    1, "Sweep Chart of PV";
    2, "PV as Text"
  }
}
```

From the above example, user configured menu preferences (configure_param1, configure_param2 and configure_param3) may be defined and stored locally as FILE data (user_configuration) in the user's database, such as the DDL-based host 50. The use of the FILE statement in the DDL calls upon the menu preferences when the DDL is utilized by, for example, the workstation 14 to display the DDL graphical user interface.

The MENU statement describes the graphical user interface (process_variables_root_menu) to get a Variable, and implements a user preference (configure_param1) as indicated above to determine the layout of the interface. The particulars of the graphical user interface preferences (e.g., pressure gauge, pressure chart, values) are then defined with "switch" signaling a change from the default menu provided in the DD from the manufacturer or DD developer. In the example above, the screen title and display style is specified with LABEL ("Process Variables") and STYLE WINDOW, respectively. The screen layout is then determined using the user preference (configure_param1). The user preference (configure_param1) in this example defines how the information (pressure) is to be displayed, which may be in one or more formats (e.g., gauge, chart, text) for the same information (gauge_showing_pressure, sweep_chart_plotting_pressure, pressure_value_as_text). These formats are part of the DDL MENU constructs of the DD.

As mentioned above, conditionals refer to the use of child objects dependent on a variable. For example, if the user configures the display to monitor a pressure variable, the pressure is expected to be maintained between upper and lower limits, where a pressure reading falling outside those limits may trigger an alert or alarm. Configuring the graphical user interface to show the variable pressure may therefore invoke the conditional or child objects for the upper and lower range values for pressure. A user is able to select the variable (pressure) and other menu constructs (e.g., gauge, chart, text) associated with the variable, and is automatically presented with child objects (e.g., other variables) that are dependent upon the variable (e.g., pressure_upper_range_value, pressure_lower_range_value) to be added to the graphical user interface. The DDL conditionals may also make such a selection mandatory, such that inclusion of the menu construct (e.g., pressure) in the DDL graphical user interface is conditioned upon selection of a further menu construct (e.g., pressure_upper_range_value, pressure_lower_range_value).

The VARIABLE statement describes the variable data to be displayed in accordance with the graphical user interface (process_variables_root_menu) described in the MENU statement. A Variable is any value or type of data (e.g., enumerated, integer, floating point, alphanumeric, etc.) contained in the field device or used by the host system 50 to interact with the field device (e.g., pressure in a pressure transmitter, upper and lower range limits, device tag, etc.). The structured information for a Variable may further specify how the Variable will be displayed, a display name, associated devices, help files, etc. In the above example, the Variable pressure is an enumerated value (TYPE ENUMERATION) with display name "Process Variables First Item". The ITEMS attribute specifies selected elements of the DD which will be displayed to the user ("Gauge of PV", "Sweep Chart of PV", "PV as Text").

Figure 3:
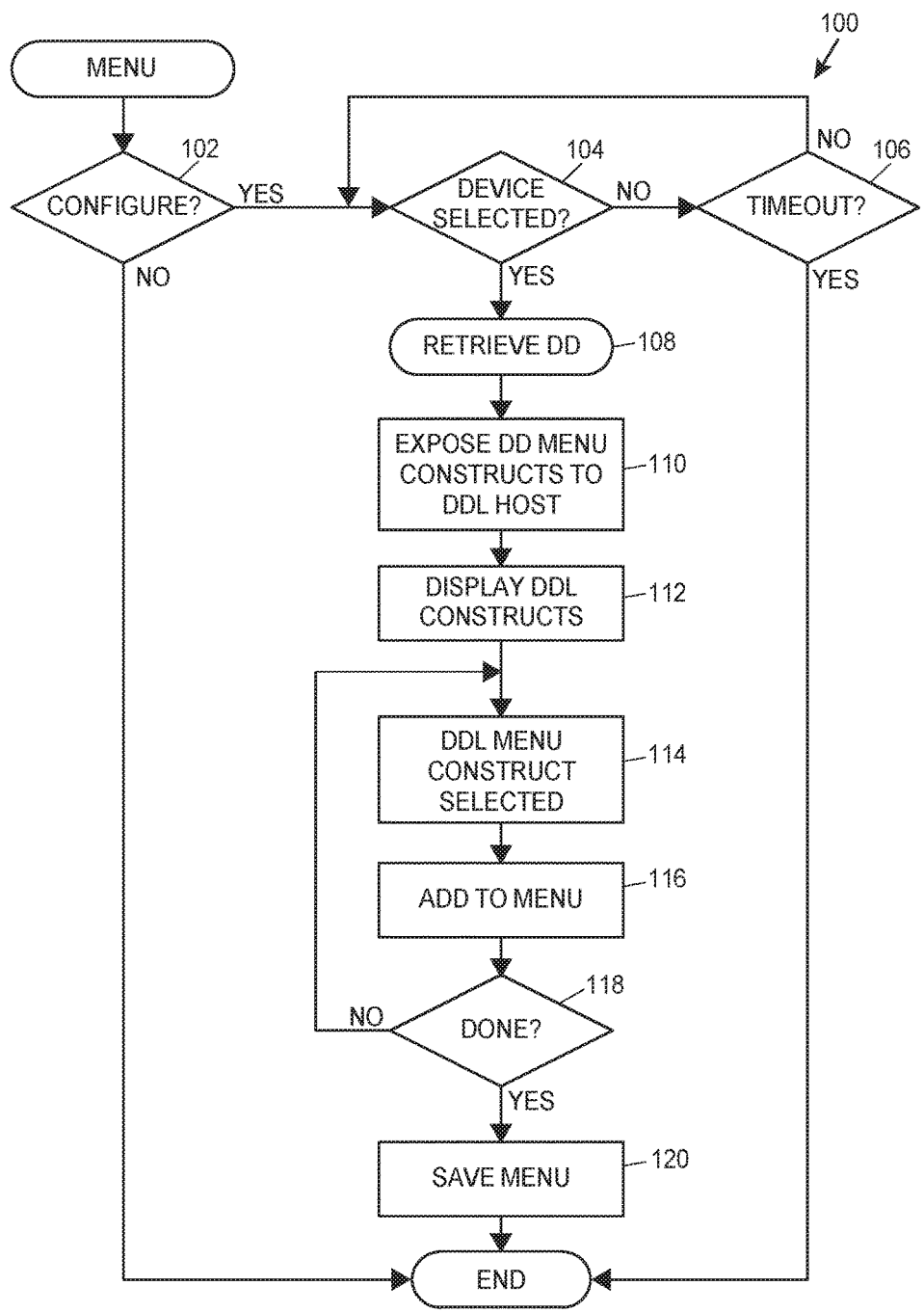
FIG. 3 is a flowchart of an exemplary DDL graphical user interface configuration routine for configuring a new DDL graphical user interface maintained by a DDL-based host in accordance with this disclosure.
Figure 4:
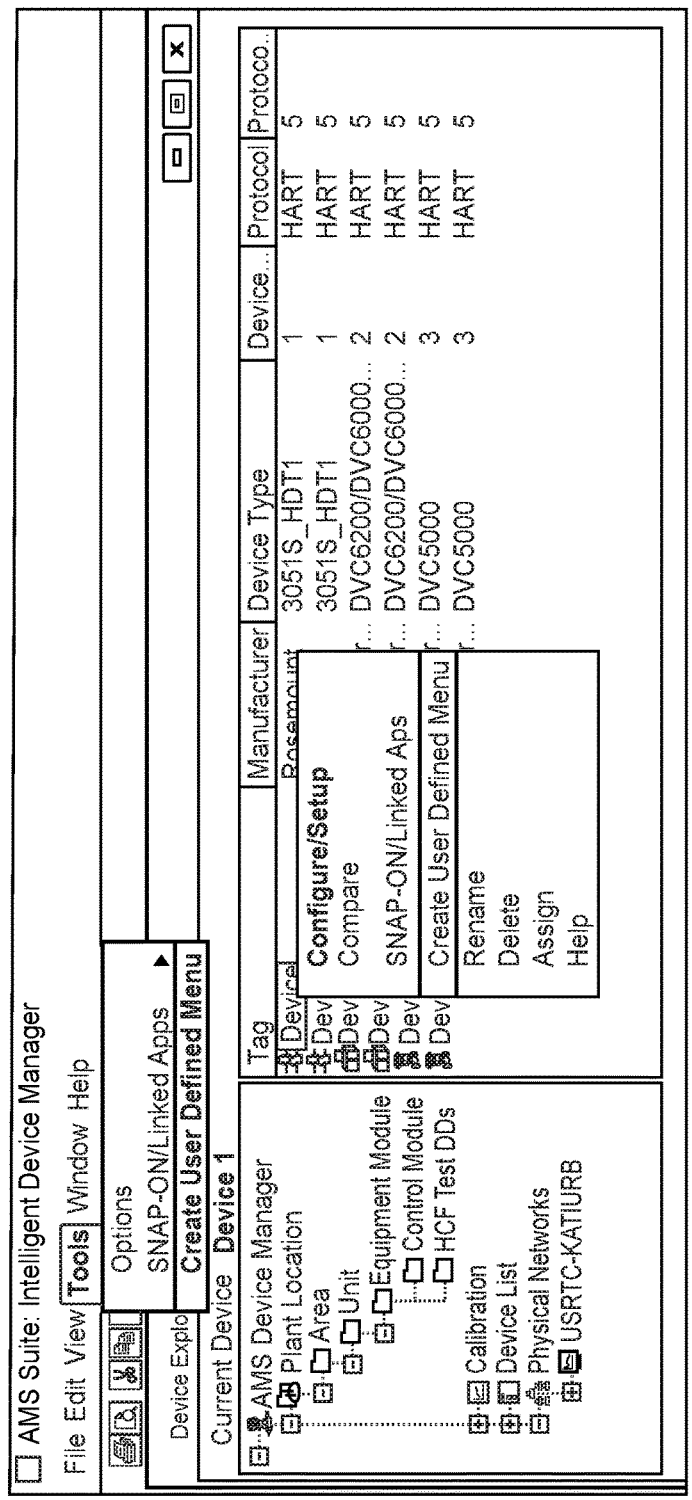
FIG. 4 is an exemplary graphical user interface for creating a DDL graphical user interface in accordance with this disclosure.
Figure 5:
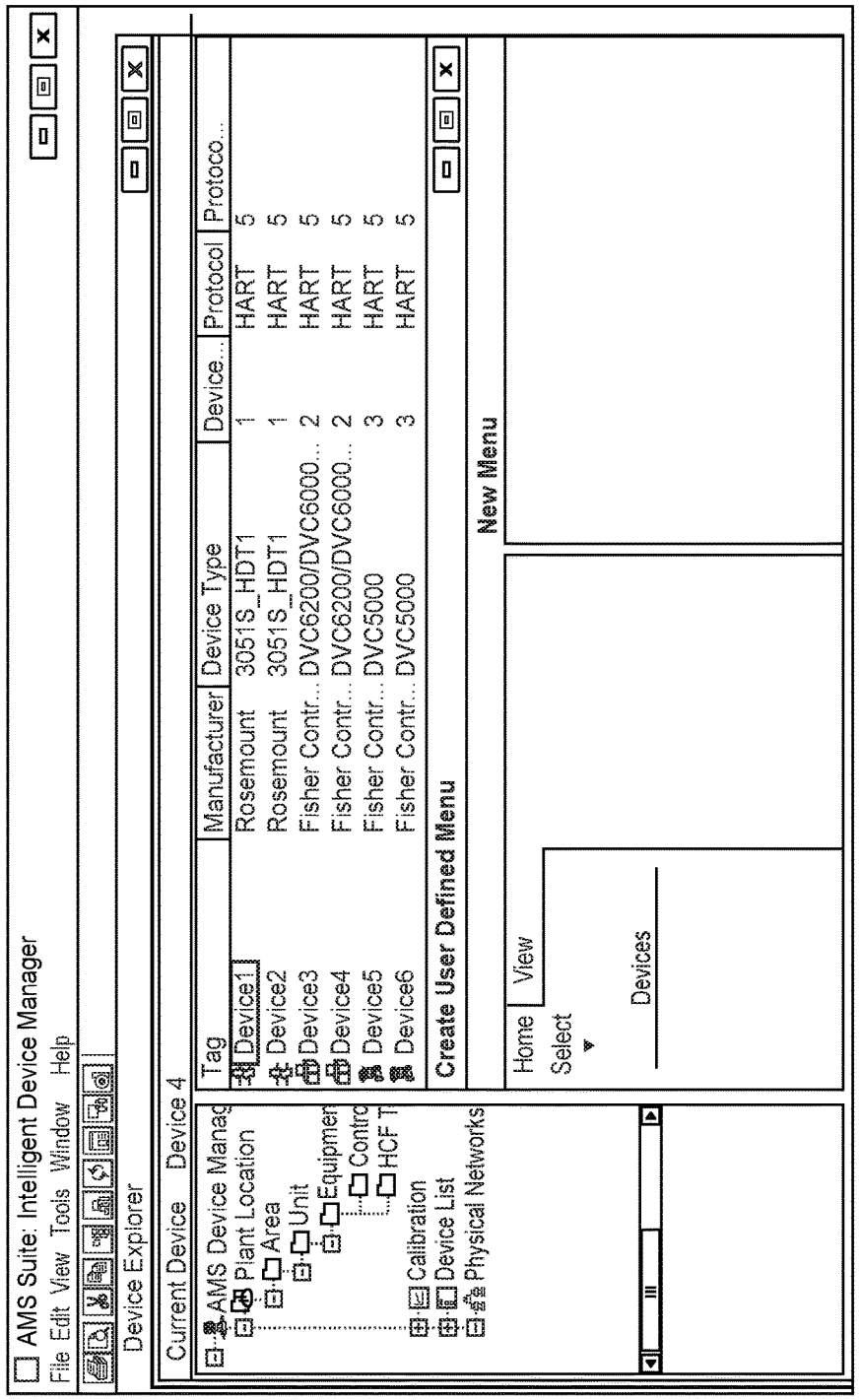
FIG. 5 is an exemplary graphical user interface for selecting devices to create a DDL graphical user interface in accordance with this disclosure.

In order to create a DDL graphical user interface for a specific device or group of devices, such as a family of devices or logical grouping of devices, such as a loop, unit, area, etc., the DD(s) for the device(s) is retrieved and all DDL menu constructs within the DD are exposed. FIG. 3 is a flowchart of a DDL graphical user interface configuration routine 100 for configuring a new DDL graphical user interface maintained by the DDL-based host 50. Referring to FIG. 3, the configuration routine 100 determines whether a command has been received to configure a DDL graphical user interface for a device (or group of devices) at block 102. FIG. 4 provides an example of a graphical user interface (GUI) from which a user may select the option to create a DDL graphical user interface for a device or group of devices ("Create User Defined Menu"). As shown in FIG. 4, the option to create a user-defined menu may be provided via a device management tool, such as the AMS® Device Manager provided as part of AMS® Suite sold by Emerson Process Management™. As shown in FIG. 4, the option may be selected from a dropdown menu in the GUI toolbar, or by selecting the device(s), for example by right-clicking the name or icon of the device(s) which displays a menu with the option to create a DDL graphical user interface for the device(s). Once the user selects the option to create a DDL graphical user interface, the GUI may display a window or frame as shown in FIG. 5 from which to configure the DDL graphical user interface. The window of FIG. 5 is an example of a display for a configuration interface for creating and configuring DDL graphical user interfaces which may be presented to the user in order to select particular ones of the devices from the list and expose the DDL constructs and configure the menu for the selected device(s).

Upon receiving a command to configure a DDL graphical user interface at block 102, the configuration routine 100 determines whether a device or group of devices has been selected at block 104. A user may select one or more devices from the list of devices presented in the GUI, such as Device1-Device6 as shown in FIG. 4. The device(s) selected by the user may be those devices within the user's control/accessibility and/or within a particular physical or logical group of devices. For example, if the user is an operator, the user may be presented with a list of those devices for which the user has authorization to monitor and/or control. Alternatively, or in addition, the list of devices presented to the user may be those within a physical and/or logical grouping, such as a loop, unit, area, etc. For example, as shown in FIG. 4, Device1-Device6 are all devices for a particular piece of equipment.

The user may select devices by, for example, dragging the icon representing the device presented in the list into the configuration window shown in FIG. 5 (i.e., drag-and-drop). Alternatively, if the user selects the option to create a DDL graphical user interface by selecting the device(s) (e.g., by right-clicking the device icon), the selected device(s) may be automatically added to the configuration window. The configuration routine 100 may time out (block 106) after a specified period of time.

Figure 6:
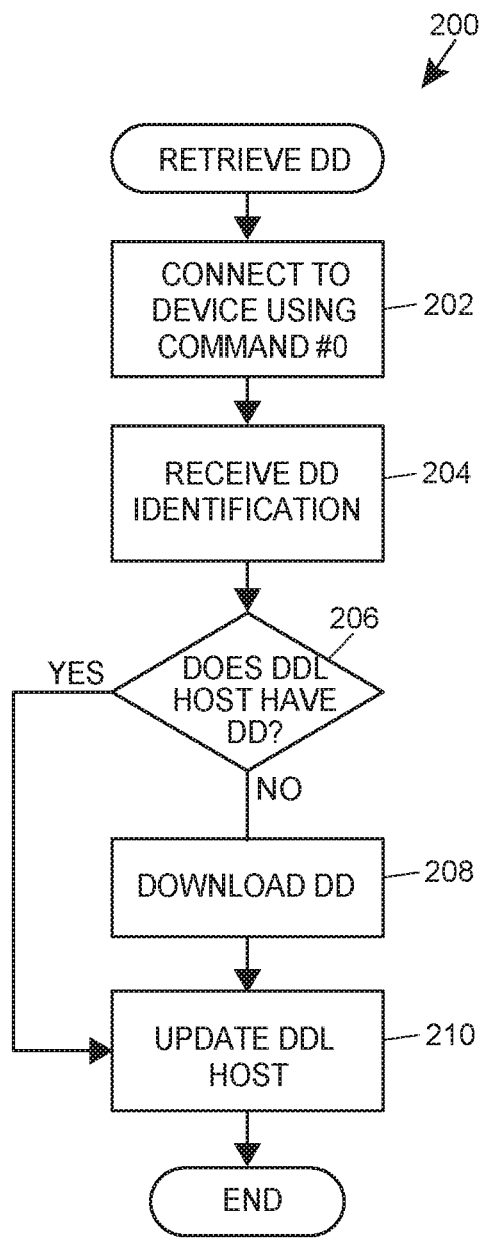
FIG. 6 flowchart of an exemplary device description retrieval routine for retrieving device descriptions of a selected device in accordance with this disclosure.

Once one or more devices are selected, the configuration routine 100 retrieves the DD for the selected device(s) at block 108. The DD for a device may be retrieved from the DD library 52 of the DDL-based host 50 if previously provided from the device itself, from the management information system 56, from one of the various DD databases 58, 60, 62, or from the device manufacturer database 64. FIG. 6 is an example of a DD retrieval routine 200 for retrieving device descriptions of a selected device at block 108 of FIG. 3. Beginning at block 202, the DDL-based host 50 connects to the device and, using a known command, requests a DD identification for the device. The DD identification request may be specified in the protocol used to communicate with the device. For example, if the HART protocol is used, a command #0 may be sent to the device to request the DD identification for that device. The request to the device can be sent from the DDL-based host 50 over the communication link 40, or via any other communication link between the DDL-based host 50 and the device.

At block 204 the DD identification is received from the device in response to the request sent by the block 202 and the received DD identification for the device is stored in memory. As is known, the DD identification provided by the device may contain information such as a manufacturer ID, a device identifier, a device revision, etc., for the device. At block 206 the DD retrieval routine 200 determines whether the DDL-based host 50 (or DDL-based host application) has the DD for the device using the device information within the received DD identification. For example, block 206 may involve a search of the local DD library 52 or the host application on the DDL-based host 50 for the DD identified by the DD identification for the device.

If it is determined that the DDL-based host 50 does not have the DD for the device, at block 208 the DD retrieval routine 200 identifies a DD database, such as the HART database 58, connected to the Internet 54 that has the DD for the device and sends a request to the database to obtain the DD for the device. DD databases may be identified by sending a request over the Internet 54 and analyzing responses to such a request. Of course, the Internet addresses of likely or known DD databases, such as the HART database 58, the FOUNDATION Fieldbus database 60, the PROFIBUS database 62 or one or more manufacturer's databases 64, etc., may be stored by the DDL-based host 50, which may connect to these databases to search for the desired DD. The DD retrieval routine 200 may also use any desired search engine, browser, etc., to search for the desired DD. If desired, the DD retrieval routine 200 may interact with the operator using an interactive screen to enable the operator to assist in finding the appropriate DD on the Internet 54. When a database is found that contains the DD for the device, the DD retrieval routine 200 sends a request to the database to obtain the DD for the device. Such a request to the database may contain some or all of the information contained in the DD identification for the device as obtained at block 204.

After the DD for the device is downloaded to the DDL-based host 50 at block 208, or when it is determined that the DDL-based host 50 has the DD for the device at block 206, the DD retrieval routine 200 updates the DDL-based host 50 at block 210. A user may specify that the DDL-based host 50 should be automatically updated for DDs as necessary. Alternatively, a command can be sent at block 210 to update the DDL-based host 50 with a desired DD. An updating of the DDL-based host 50 with the DD for the device may involve saving the DD for the device into memory at a specific location and inserting, as necessary, a call to that specific location into the DDL-based host 50. The updating of the DDL-based host 50 with the DD for the device may also involve inserting the DD for the device in the DD library 52.

Referring again to FIG. 3, once the DD for the selected device(s) has been retrieved, the configuration routine 100 reads the DD for the device and exposes all DDL menus and DDL menu constructs (e.g., menu items or parameters displayed in a menu such as variables, graphs, images, grids, charts, etc.) within the DD to the DDL-based host 50 (or host application) at block 110. For example, the configuration routine 100 may scan and analyze the DD to make all DDL menu constructs available to the user through the configuration interface, such that the DDL menu constructs and values may be provided to the configuration routine 100, as well as additional routines described further below, to design a DDL graphical user interface having user-desired menu options and parameters to be applied to the DDL graphical user interface. It should be understood that the manufacturer may still want to restrict what the user can access. As such, exposing the DDL menus and DDL menu constructs allows the user to configure the DDL graphical user interface in terms of how the user views the information, but does not necessarily allow the user to view any and all information. That is, the data normally displayed in the default device menu generated from the resource file developed by the device manufacturer remains available to the user, but exposing the DDL menu and DDL menu constructs does not expose further data to the user. Rather, exposing the DDL menu and DDL menu constructs takes the menu constructs that the user is already able to view in the default device menu makes them optional such that the user is able to configure how that data is presented in the DDL graphical user interface.

Figure 7:
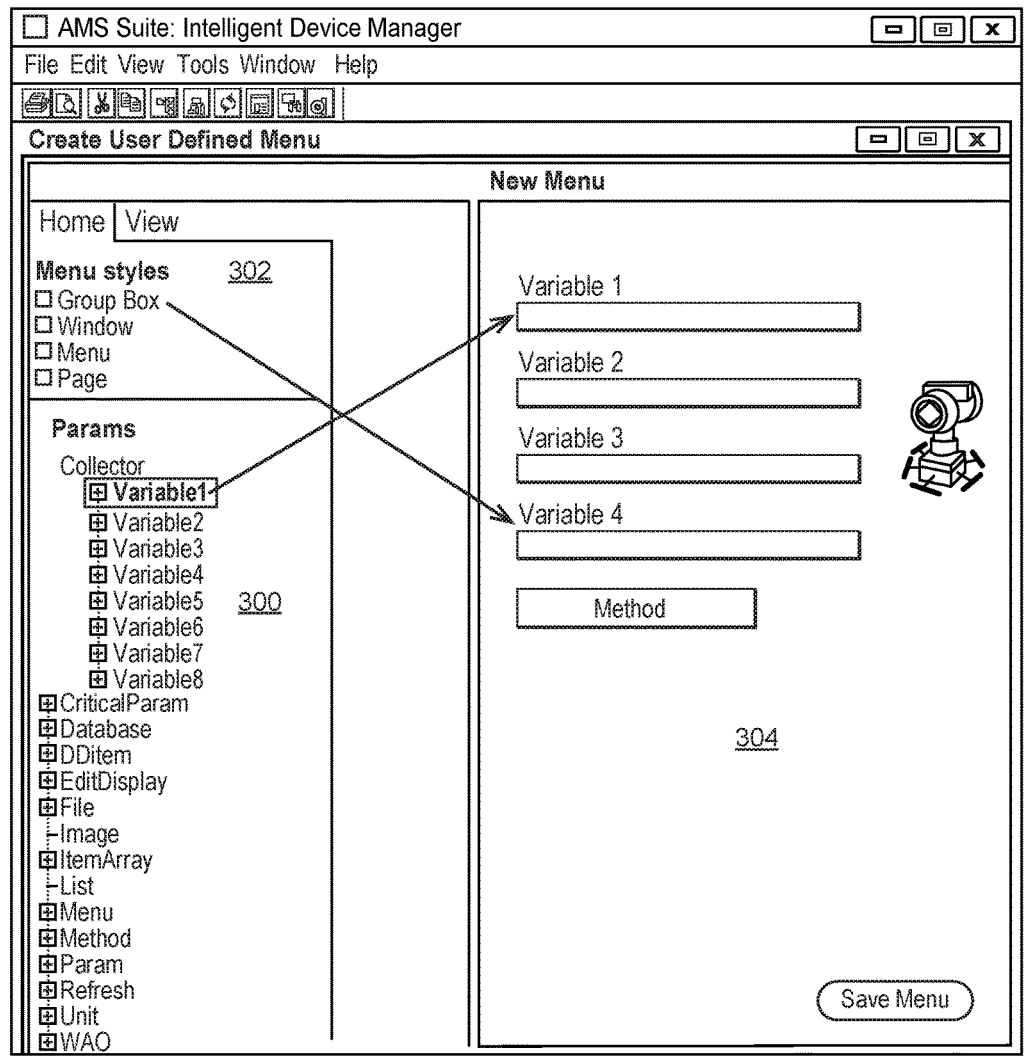
FIG. 7 is an exemplary graphical user interface in which to create and configure a DDL graphical user interface in accordance with this disclosure.

At block 112, the DDL menu constructs are presented to the user in the configuration interface, an example of which is shown in FIG. 7. As seen in FIG. 7, the configuration interface presents the exposed DDL menu constructs ("Params") in a menu constructs template 300. Although shown as Variable# (Variable1, Variable2, Variable3, etc.) for exemplary purposes, the names of the DDL menu constructs are presented and clearly described in a manner understandable to the user. In addition to the menu constructs template 300, a menu styles template 302 may also be provided to present options for different types of menus (e.g., Group Box, Window, Menu, Page). A configuration template 304 acts as a template for the DDL graphical user interface and provides an area in which the user can design the DDL graphical user interface.

At block 114, a DDL menu construct may be selected and added to the DDL graphical user interface at block 116 in accordance with the user's preferences (e.g., placement, menu style, etc.). For example, referring to FIG. 7, the user may select particular graphical icons representing the DDL menu constructs from the menu constructs template 300, drag the icons into the configuration template 304 and place the DDL menu constructs where the user wants. Within the configuration template 304, the user may arrange the menu constructs in any desired fashion. Likewise, the user may select an icon representing a menu style from the menu styles template 302, drag the icon into the configuration template 304 and place the menu style where the user wants. Within the configuration template 304, the user may arrange the menu styles and/or menu constructs in any desired fashion. For example, rather than have a DDL graphical user interface showing all relevant information for monitoring a specific device, the user may select multiple devices and select the temperature variable for each device for display in a DDL graphical user interface, thereby creating a DDL graphical user interface customized to show only temperature readings, only pressure readings, or any other variable for multiple devices, which is a feature not supported by default menus from a device DD because the DDs are specific only to a particular device or device type.

When a menu construct is added to the DDL graphical user interface at block 116, the configuration routine 100 may also determine whether the added menu construct has one or more dependencies (e.g., child objects dependent upon a variable). In such a case, the configuration routine 100 may revert control at block 118 back to block 114, and present only the menu constructs that are dependent upon the prior-selected menu construct using DDL conditionals. For example, if the added variable is pressure for a selected device, dependencies for pressure may be critical parameters such as upper and lower range values. Using DDL conditionals, the configuration routine 100 may "hide" all other menu constructs and present only upper and lower range menu constructs for pressure to the user. Further, using DDL conditionals, the configuration routine 100 may even prevent the user from completing and saving the menu until the conditionals are satisfied, such that inclusion of the menu construct in the DDL graphical user interface is conditioned upon selection of further menu constructs.

DDL conditionals may also be used to guide the user in configuring the menu, given that a device (or group of devices) may have many menu constructs within the DD. While the configuration routine 100 exposes menu constructs for the purpose of configuring a DDL graphical user interface, DDL conditionals may be used to simplify the presentation of the menu constructs to the user by presenting only a subset of menu constructs and "hiding" all others, and then presenting only those menu constructs that are relevant to the prior-selected menu construct. For example, the configuration routine 100 may begin with presenting only the variables for the selected device(s) (e.g., pressure, temperature, etc.), while "hiding" all other menu constructs (e.g., graphs, charts, dependencies, etc.) for the variables. Once a variable is selected (e.g., pressure), all other menu constructs (including unselected variables) may be hidden or otherwise not selectable except for those relevant to the selected variable (e.g., pressure graphs, pressure charts, pressure dependencies, etc.). Once the DDL conditionals for a variable have been satisfied, the configuration routine 100 may revert back to presenting only the variables for the selected device(s).

In one embodiment, even the presentation of relevant menu constructs may be based on DDL conditionals. For example, when a user selects the variable "pressure", the configuration routine 100 may then present menu constructs for the upper and lower range values for pressure. Only once the user selects the menu constructs for upper and lower range values does the configuration routine 100 present menu constructs for graphs, charts, etc. for pressure. Thus, the graphs, charts, etc. are made dependent upon the upper and lower range values for pressure, which are, in turn, dependent upon the variable pressure. In this manner, DDL conditionals may be utilized to make even relevant menu constructs dependent upon each other in order to guide the user through the configuration. In some cases, the DDL conditionals may be mandatory (e.g., selecting upper and lower range values for pressure) such that the configuration routine 100 will not proceed or allow the user to finish and save the menu until the menu construct is selected. In other cases, the DDL conditionals may be optional (e.g., selecting a graph or chart for pressure). Thus, the use of DDL conditionals may be used to guide the user through the configuration of the menu without overwhelming the user with the number of DDL menu constructs available as options for inclusion in the DDL graphical user interface.

If the user is done configuring the DDL graphical user interface, as determined at block 118, the menu may be saved at block 120. If not, control may return to block 114 for the next DDL menu construct selection. When the configured DDL graphical user interface is saved at block 120, the DDL graphical user interface is saved with the DDL-based host 50. In particular, the DDL graphical user interface is saved as FILE data with the values of chosen DDL menu constructs stored in the user database, such as that of the DDL-based host 50. The DDL menu constructs may be stored as FILE data as LOCAL variables, rather than being stored with the device. By storing the user preferences as FILE data, DDL graphical user interfaces may be created and stored without having to change existing firmware, and requires no additional changes to the device itself. That is, the solution is entirely within the DDL. Thus, the user is able to configure a DDL graphical user interface that is dynamically created and maintained by the DDL-based host 50. The configuration interface, such as that shown in FIGS. 4, 5 and 7, allows the user to pick and choose the DDL menu constructs that are important to the user, with those constructs added to the DDL graphical user interface. As will be discussed further below, the user may call and activate the DDL graphical user interface at any time, hide the DDL graphical user interface, and reconfigure the DDL graphical user interface with different DDL menu constructs.

Figure 8:
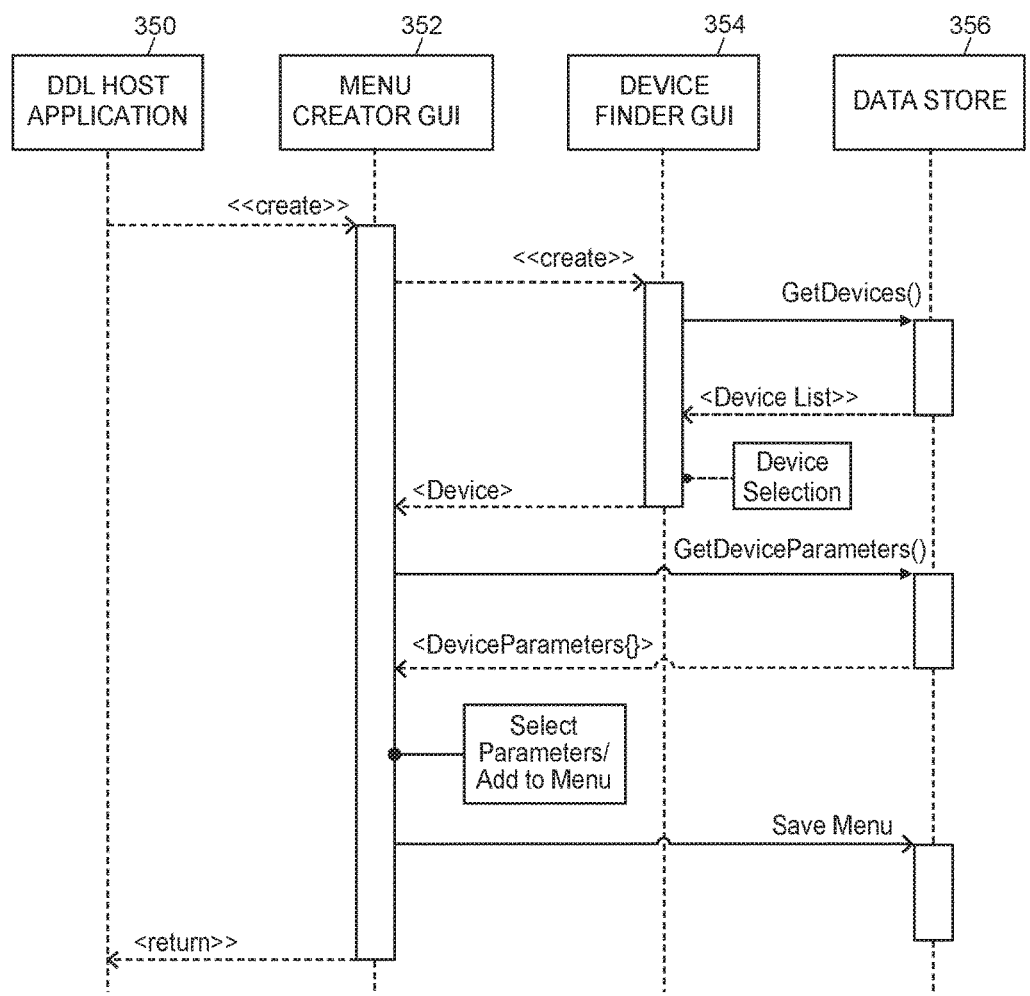
FIG. 8 is an exemplary sequence diagram showing the interactions among processes in creating a user-defined device description menu maintained by a DDL-based host system in accordance with this disclosure.

FIG. 8 is a sequence diagram showing the interaction among processes in creating and configuring a DDL graphical user interface maintained by a DDL-based host system 50 based upon the method disclosed in FIG. 3. Beginning with a DDL host application 350, which may be executed on the DDL-based host 50, an asynchronous call to create a new user-defined menu ("create") is issued to a menu creator interface 352. The DDL host application 350 may be an application from the AMS® Suite, and the menu creator interface 352 may be the configuration interface for creating and configuring menus depicted in FIGS. 5 and 7, with the call being made from the AMS® application to the configuration interface for creating menus. The call to create a new DDL graphical user interface may be made in response to a command to configure a DDL graphical user interface at block 102 of FIG. 3 when the user selects the "Create User Defined Menu" option in FIG. 4. In turn, another asynchronous call to create the DDL graphical user interface ("create") may be made from the menu creator interface 352 to a device finder interface 354, such as the AMS® Device Manager or other device management tool depicted in FIG. 4. Alternatively, the call to create a new DDL graphical user interface may originate from the menu creator interface 352 if already launched otherwise. Likewise, the call to create a new DDL graphical user interface may originate from the device finder interface 354, such as when the user selects a device from the list of devices in the device management tool as discussed with respect to FIG. 4, in which case the call is issued from the device finder interface 354 to the menu creator interface 352.

The call to create a new user-defined menu causes the device finder interface 354 to issue a synchronous call ("GetDevices") to a data store application 356 in order to retrieve a list of devices to present to the user for selection as at block 104 in FIG. 3. In response, the data store application 356 returns a list of devices ("Device List") to the device finder interface 354. The list of devices may be those that the user is authorized to monitor and/or control, or devices within a particular loop, unit, area, etc. based on a selection of the loop, unit, area, etc. made in the device finder interface. For example, if the user has selected a particular unit using a navigation tree, the devices for that unit (including all loops within that unit) may be retrieved from the data store 356. Likewise, if the user has selected a particular loop within a unit using a navigation tree, the devices for that loop may be retrieved from the data store 356.

The device finder interface 354 may then present those devices to the user, and, in response, the device finder interface 354 may receive a message externally from the sequence indicating a selection of a device(s) from the user ("Device Selection"), corresponding to block 104 of FIG. 3. In response, an asynchronous message ("Device") is sent from the device finder interface 354 to the menu creator interface 352 signifying the selected device(s). The creator interface 352 then issues a synchronous call ("GetDeviceParameters") to the data store application to retrieve all DDL menu constructs for the selected device(s). The call to retrieve the DDL menu construct may invoke a subroutine in the data store application 356 to retrieve the DD for the selected device(s) as depicted at block 108 of FIG. 3 and in FIG. 6.

The data store application 356 responds to the menu creator interface 352 with the list of menu constructs for the selected device(s) ("DeviceParameters"), at which point the menu constructs are exposed to (or by) the menu creator 352 for presentation to the user. The menu creator interface 352 may then receive a synchronous message ("Select Parameters/Add to Menu") externally from the sequence indicating the DDL menu constructs selected by the user for addition to the menu, corresponding to blocks 114-118 of FIG. 3 and the interface depicted in FIG. 7.

The addition of menu constructs to the DDL graphical user interface may involve mapping the DDL graphical user interface to the selected DDL menu construct. Mapping DDL graphical user interface to the selected DDL menu construct may involve inserting a call or command into the DDL graphical user interface FILE data to call the DDL menu construct when activating the DDL graphical user interface. Mapping may also involve adding a value to the DDL graphical user interface FILE data that is linked (mapped) to the DDL menu construct. For example, referring to the partial pseudo-code example of DDL for a DDL graphical user interface utilizing FILE data provided above, the DDL menu constructs "gauge_showing_pressure", "sweep_chart_plotting_pressure" and "pressure_value_as_text" may act as calls to display the graphical representations of the DDL menu constructs on the display device when the DDL graphical user interface is activated. The Variable (pressure) has values of "0", "1" and "2" which are respectively mapped to the DDL menu constructs "gauge_showing_pressure", "sweep_chart_plotting_pressure" and "pressure_value_as_text".

Once the DDL menu constructs have been selected and added, an asynchronous call to the data store 365 is made to save the DDL graphical user interface ("Save Menu"), corresponding to block 120 of FIG. 3. As discussed above, the DDL graphical user interface may be stored as DDL FILE data on the DDL-based host 50. The DDL-based host 50 is tasked with maintaining the integrity of the DDL menu construct information as retrieved from the associated device and as exposed during the configuration routine 100, where the DDL menu constructs may be saved locally, such as in the DD database 52. The DDL-based host 50 further issues the commands needed to acquire the DDL construct data values. For example, where the DDL constructs within the FILE data act as calls, the DDL-based host 50 interprets these calls and issues commands to retrieve the DDL constructs for the DDL graphical user interface from the local database and display the DDL constructs as part of the DDL graphical user interface.

Figure 9:
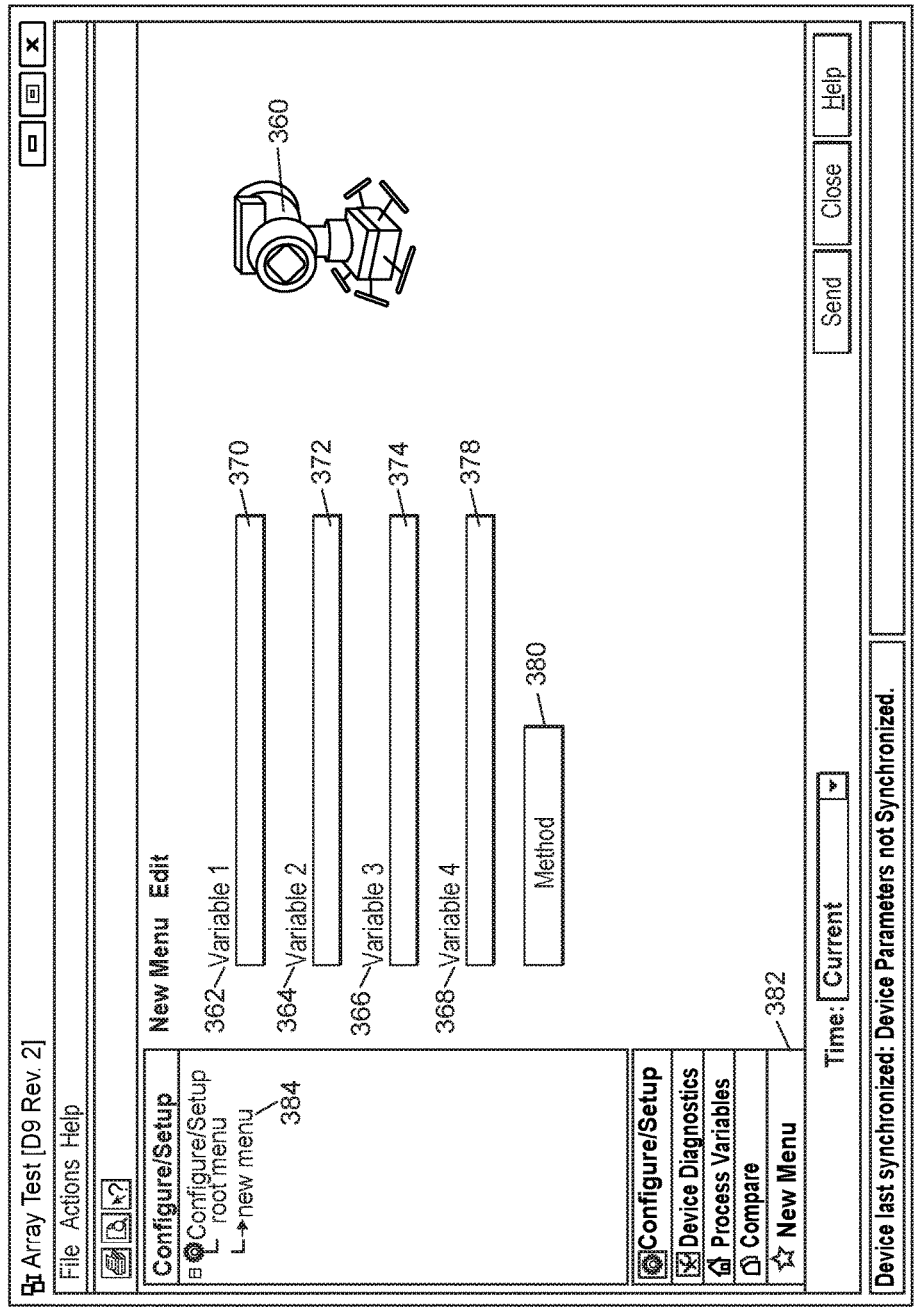
FIG. 9 is an exemplary graphical user interface showing a user-defined device description menu.

An example of a user-configured DDL graphical user interface is shown in FIG. 9, which includes an image (graphical representation)(360 of the selected device, graphical representations of the variables 362-368 selected by the user along with boxes 370-378 to input values for the variables, and a MENU option 380 to invoke a DDL METHOD. Once the DDL graphical user interface is saved, the DDL graphical user interface may be viewed in a menu device template (e.g., window or frame). Using a DDL host application, such as an AMS® Suite application, the DDL graphical user interface may be activated or called by selecting a shortcut bar 382, as a navigation menu option 384 or by selecting a device (e.g., right-clicking on a device name or icon) from a device list to generate a context menu with the DDL graphical user interface as an option. Although displayed as "new menu" the labels for these options may be the same of the DDL graphical user interface as saved by the user.

Figure 10:
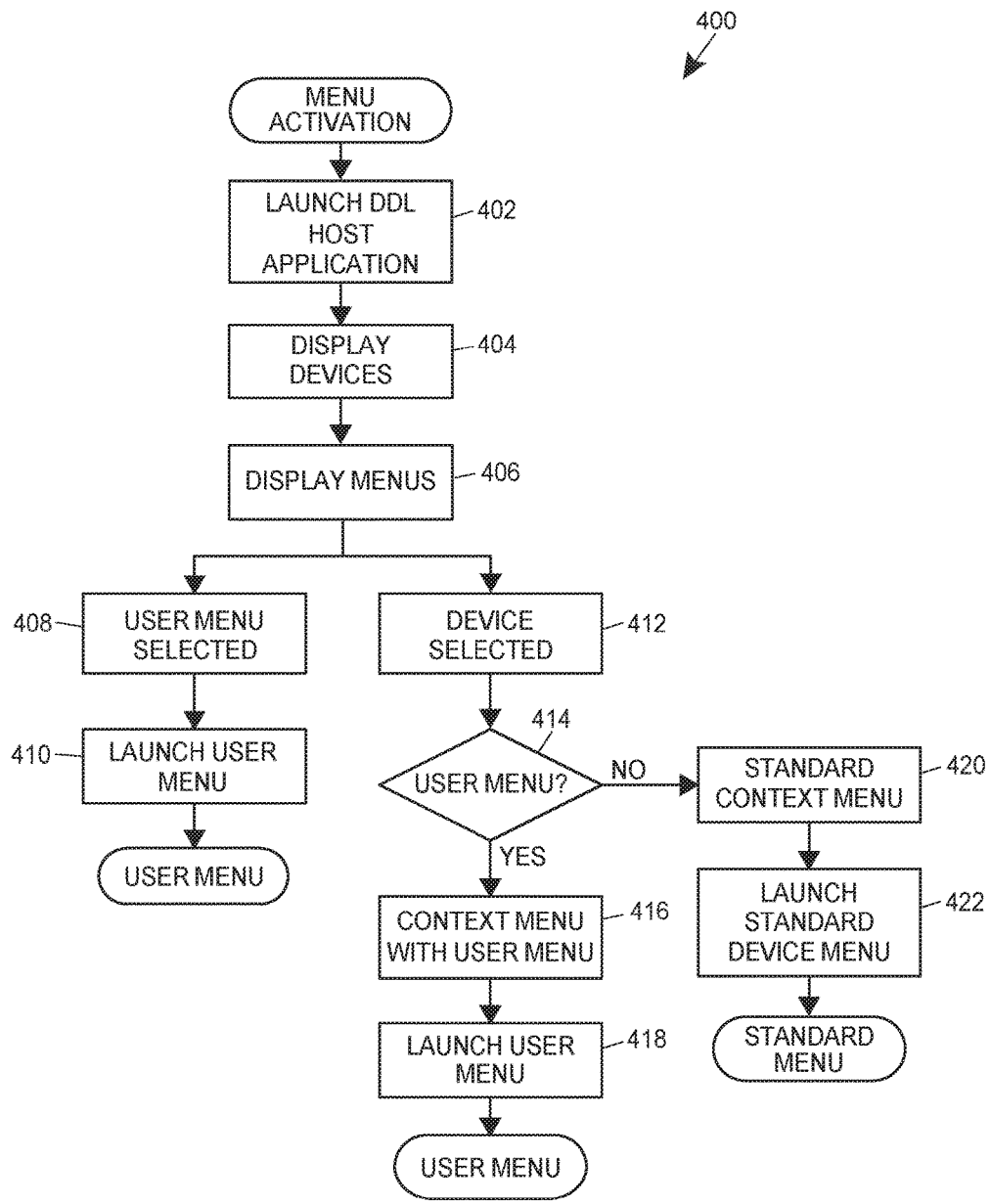
FIG. 10 is a flowchart of an exemplary menu activation routine for activating a DDL graphical user interface in accordance with this disclosure.

FIG. 10 is a flowchart of an exemplary DDL graphical user interface activation routine 400 for activating a DDL graphical user interface from a DDL host application, such as AMS® Device Manager. Beginning at block 402, the DDL host application is launched using, for example, the DDL-based host 50 or other workstation 14. The DDL host application may list or otherwise display one or more devices to the user at block 404, such as, for example, devices within the user's authorization for monitoring and/or control. As previously mentioned, the device may be within a particular loop, unit, area, etc. Alternatively or in addition, the DDL host application may display one or more menu options associated with the devices as at block 406 including the default standard DD menu provided by the manufacturer of the device or developer of the DD, and any configured DDL graphical user interfaces for the selected device.

The user may select a menu in a variety of ways, including, but not limited to, selecting the device from the list of displayed devices or selecting a DDL graphical user interface from the displayed menu options. For example, at block 408 a DDL graphical user interface may be selected from the menu options, with the selected DDL graphical user interface being launched at block 410. If a device is selected at block 412, for example by right-clicking a device name or icon, the menu activation routine 400 may determine whether a DDL graphical user interface exists or not at block 414. If so, the selection of a device at 412 may cause a context menu to be generated with the DDL graphical user interface as an option at block 416. Upon selecting the option for the DDL graphical user interface, the DDL graphical user interface is launched at block 418. If a DDL graphical user interface does not exist, the menu activation routine 400 may cause a standard context menu to be generated at block 420. Upon selecting the option for a default standard device menu, the default standard device description menu is launched at block 422 using the DD and resource file for the device.

Figure 11:
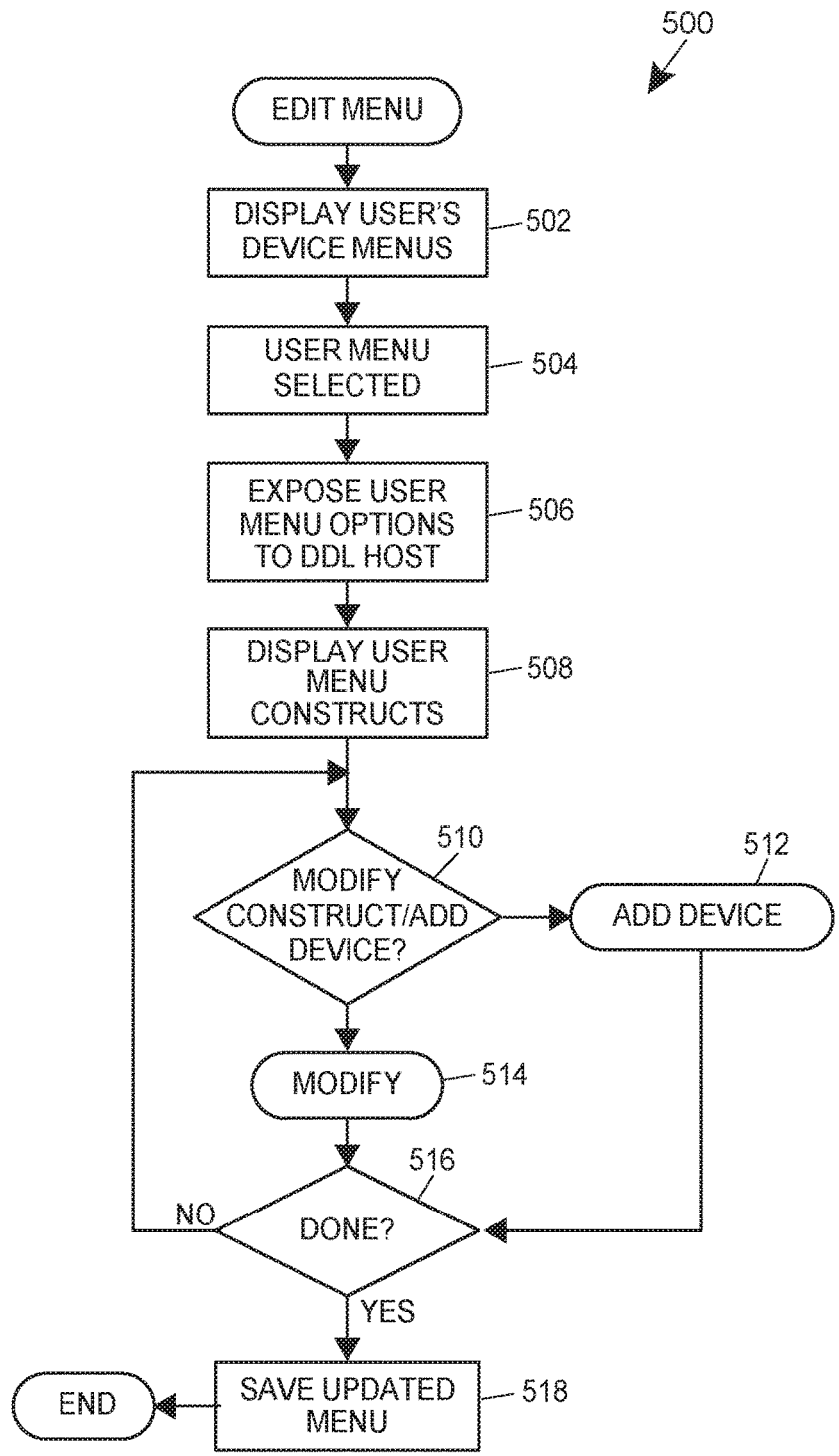
FIG. 11 is a flowchart of an exemplary device description menu editing routine for editing an existing DDL graphical user interface in accordance with this disclosure.

Once a DDL graphical user interface has been created, configured and saved, the DDL graphical user interface may be edited to modify one or more DDL menu constructs within the DDL graphical user interface (e.g., delete a construct, add a construct, modify a construct) or to add DDL menu constructs for a new device. FIG. 11 is an example of an editing routine 500 for modifying or adding a device to an existing DDL graphical user interface. Beginning at block 502, the user's DDL graphical user interfaces are displayed. The DDL graphical user interfaces may be presented in a GUI similar to that shown in FIG. 9, whereby the user may select a DDL graphical user interface from a shortcut bar 382, or as a navigation menu option 384. In one example, the option to edit the selected the DDL graphical user interface may be made from the tool bar, or by selecting (e.g., right-clicking) the DDL graphical user interface listed in the shortcut bar 382 or navigation menu 384 to generate a context menu with an option to edit the DDL graphical user interface.

Once a DDL graphical user interface has been selected at block 504 with the option to edit the DDL graphical user interface, the DDL menu constructs for the DDL graphical user interface are exposed at block 506. Similar to exposing DDL menu constructs at block 110 of FIG. 3, the editing routine 500 scans and analyzes the DDL graphical user interface to make all DDL menu constructs available to the user through the configuration interface, such that the DDL menu constructs and values within the DDL graphical user interface are displayed to the user. In addition, the editing routine 500 may retrieve the DD for the device(s) that was retrieved when originally creating, or previously configuring, the DDL graphical user interface should the user want to add a DDL menu construct to the DDL graphical user interface. The editing routine 600 may likewise scan and analyze the DD to make all DDL menu constructs available to the user through the configuration interface. If the DD was not stored within the DD library 52, the editing routine 500 may utilize the DD retrieval routine 200 of FIG. 6.

Having exposed the DDL menu constructs at block 508, the DDL menu constructs are presented to the user in the configuration interface at block 508. The configuration interface may be the same at that shown in FIG. 7, with the DDL graphical user interface displayed for editing in the configuration template 304. Once the DDL menu constructs are exposed and the DDL graphical user interface presented for editing, the user may be presented with options for editing the DDL graphical user interface, such as, for example, modifying the DDL graphical user interface or adding DDL menu constructs for a new device to the DDL graphical user interface. Based on the user's selection, as determined at block 510, the editing routine 500 may add one or more DDL menu constructs for a new device to the DDL graphical user interface at block 512 or modify the DDL graphical user interface at block 514 by, for example, adding, deleting or modifying a DDL menu construct.

Figure 12:
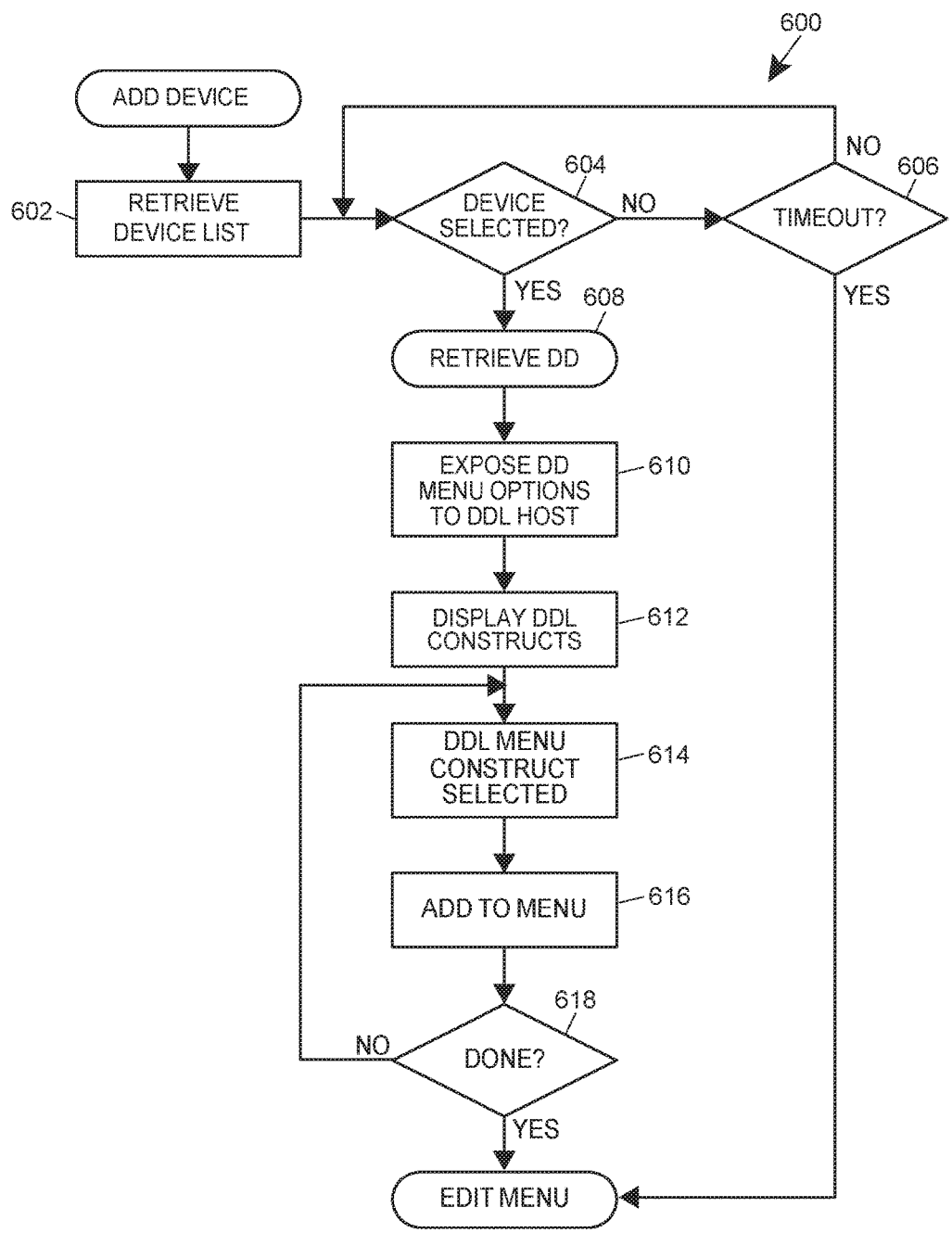
FIG. 12 is a flowchart of an exemplary device addition routine for adding DDL menu constructs for a new device to an existing DDL graphical user interface in accordance with this disclosure.

To add DDL menu constructs for a new device at block 512, a new device routine 600 may be invoked as shown in FIG. 12. The new device routine may be similar to the device description configuration routine 100 shown in FIG. 3. In particular, beginning at block 602, the devices for which DDL menu constructs may be added is retrieved and presented to the user, using, for example, the device management tool shown in FIG. 4. The add device routine 600 determines whether a device or group of devices has been selected at block 604. A user may select one or more devices from the list of devices presented in the device management tool GUI. As with creating a DDL graphical user interface, the device(s) selected by the user may be those devices within the user's control/accessibility and/or within a particular physical or logical group of devices. The user may select devices by, for example, dragging the icon representing the device presented in the list into the configuration window 304 of FIG. 5 (i.e., drag-and-drop). Alternatively, if the user selects the device(s) (e.g., by right-clicking the device icon), the selected device(s) may be automatically added to the configuration window 304. The add device routine 600 may time out (block 606) after a specified period of time.

Once one or more devices are selected, the add device routine 600 retrieves the DD for the selected device(s) at block 608. The DD for the device may be retrieved from the DD library 52 of the DDL-based host 50 if previously provided from the device itself, from the management information system 56, from one of the various DD databases 58, 60, 62, or from the device manufacturer database 64. The add device routine 600 may utilize the DD retrieval routine 200 of FIG. 6 for retrieving the DD of a selected device at block 608.

When the DD for the selected device(s) has been retrieved, the add device routine 600 reads the DD for the new device and exposes all DDL menus and DDL menu constructs (e.g., menu items or parameters displayed in a menu such as variables, graphs, images, grids, charts, etc.) within the DD to the DDL-based host 50 (or host application) at block 610. The add device routine 600 may scan and analyze the DD to make all DDL menu constructs available to the user through the configuration interface, such that the DDL menu constructs and values may be provided to the add device routine 600 to add DDL menu constructs to the DDL graphical user interface. As with FIG. 3, exposing the DDL menu and DDL menu constructs takes the menu constructs that the user is already able to view in the default device menu for the selected device and makes them optional such that the user can select which DDL menu constructs to add to the DDL graphical user interface.

At block 612, the DDL menu constructs for the new device are presented to the user in a configuration interface, such as that of FIG. 7. Using FIG. 7 as an example, the DDL graphical user interface being edited may be displayed in the configuration template 304, with the exposed DDL menu constructs provided in a menu constructs template 300. The exposed DDL menu constructs in the menu constructs template 300 may be just those exposed for the new device at block 610, or may include the DDL menu constructs for the new device as well as the DDL menu constructs used in the DDL graphical user interface and/or the DDL menu constructs for the device(s) that were retrieved when originally creating and configuring the DDL graphical user interface.

Once the DDL menu constructs are exposed and presented, a DDL menu construct may be selected at block 614 and added to the DDL graphical user interface at block 616 in accordance with the user's preferences (e.g., placement, menu style, etc.). For example, referring again to FIG. 7, the user may select particular graphical icons representing the DDL menu constructs from the menu constructs template 300, drag the icons into the configuration template 304 and place the DDL menu constructs where the user wants. Within the configuration template 304, the user may arrange the menu styles and/or menu constructs in any desired fashion. The process for adding a DDL menu construct to the DDL graphical user interface may be the same as that at block 116 in FIG. 3 described above. When a menu construct is added to the menu at block 616, the add device routine 600 utilizes the concept of DDL conditionals described above with respect to FIG. 3 for any variables that have dependencies and to guide the user in editing the DDL graphical user interface.

If the user is done adding DDL menu constructs for a new device to the DDL graphical user interface, as determined at block 618, control may return to the editing routine 500. If not, control may return to block 614 as the add device routine 600 waits for the next DDL menu construct selection.

Figure 13:
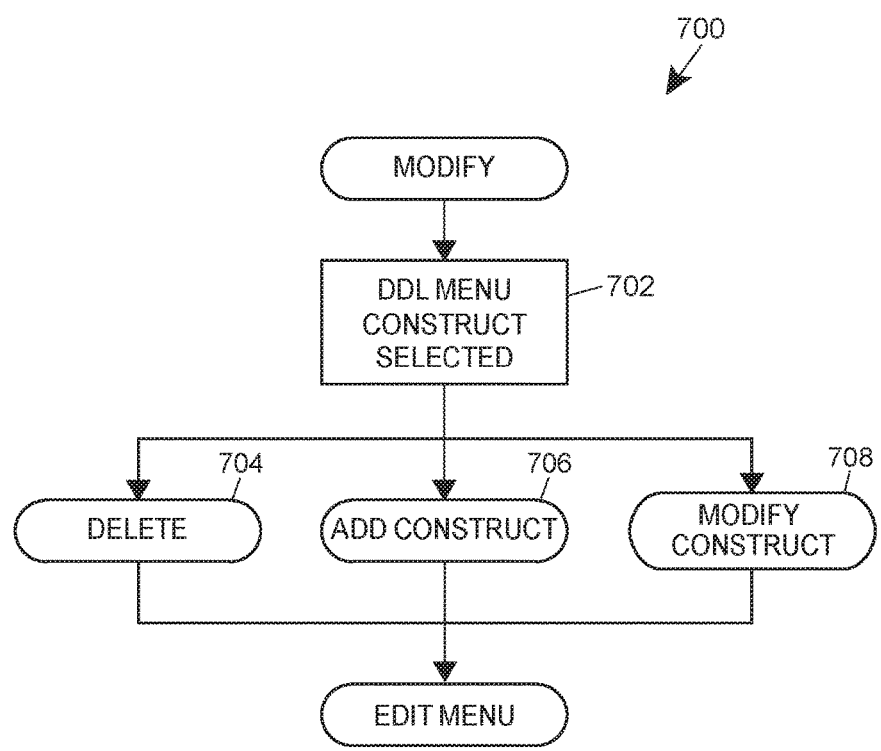
FIG. 13 is a flowchart of an exemplary DDL menu modification routine for modifying menu constructs in the DDL graphical user interface in accordance with this disclosure.

Referring again to FIG. 11, if the user selects to modify the DDL graphical user interface at block 514, the editing routine 500 may invoke a modification routine 700 as shown in FIG. 13. Beginning at block 702, a DDL menu construct is selected from the display of DDL menu constructs at block 508 based upon user input by, for example, dragging a graphical icon representing a DDL menu construct presented in the menu constructs template 300 into the configuration template 304 of FIG. 7 (i.e., drag-and-drop), dragging an icon representing a DDL menu construct presented in the configuration template 304 outside of the configuration template 304 or right-clicking an icon representing a DDL menu construct to display a context menu with options to edit the DDL menu construct. As mentioned above, the DDL menu constructs presented to the user may include both DDL menu constructs used in the DDL graphical user interface being edited, as well as DDL menu constructs for the device(s) that was retrieved when originally creating and configuring, or previously editing, the DDL graphical user interface.

Once a DDL menu construct has been selected at block 702, the modification routine 700 may proceed to present options to the user for modifying the DDL graphical user interface, such as deleting the DDL menu construct from the DDL graphical user interface, adding the DDL menu construct to the DDL graphical user interface or modifying a DDL menu construct in the DDL graphical user interface. In one embodiment, the manner in which the DDL menu construct is selected may automatically invoke the option for modifying the DDL graphical user interface. For example, if the user drags an icon representing a DDL menu construct in the configuration template 304 outside of the configuration template 304, the modification routine 700 may interpret that action as deleting the DDL menu construct from the DDL graphical user interface, and invoke a delete DDL menu construct routine at block 704. Likewise, if the user drags an icon representing a DDL menu construct from the menu constructs template 300 into the configuration template 304, the modification routine 700 may interpret that action as adding the DDL menu construct to the DDL graphical user interface, an invoke an add DDL menu construct routine at block 706. If the user clicks on an icon representing a DDL menu construct in the menu constructs template 300, the modification routine 700 may interpret that action as modifying the DDL menu construct, and invoke a modify DDL menu construct routine at block 708. Alternatively, or in addition, each of the modification options at blocks 704, 706, 708 may be invoked via a context menu (e.g., right-clicking on an icon representing the DDL menu construct) and/or via the toolbar menu.

Figure 14:
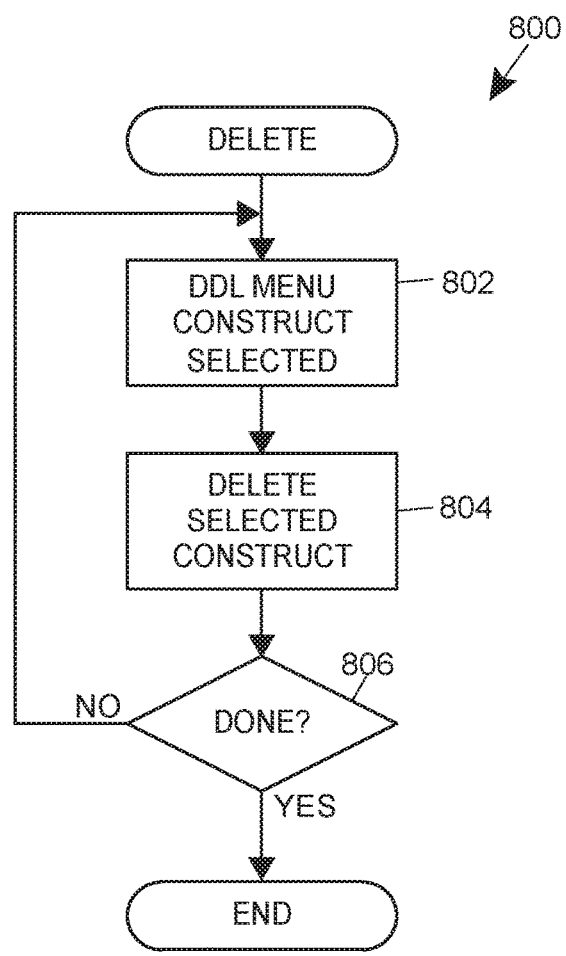
FIG. 14 is a flowchart of an exemplary DDL menu construct deletion routine for deleting DDL menu constructs from the DDL graphical user interface in accordance with this disclosure.

FIG. 14 is an example of a delete DDL menu construct routine 800 shown at block 704 in FIG. 13 for deleting a DDL menu construct from a DDL graphical user interface. Beginning at block 802, the delete DDL menu construct routine 800 may verify that a DDL menu construct has been selected, and at block 804 the selected DDL menu construct is deleted. In one example, if the modification routine 700 interprets the action of dragging an icon representing the DDL menu construct from within the configuration template 304 outside of the configuration template 304, block 802 may be used to track the movement of the icon in the configuration interface, with the deletion of the DDL menu construct from the DDL graphical user interface occurring at block 804 only once the icon has been "dropped" outside of the configuration template 304. If the option to delete a DDL menu construct is invoked via a context menu, block 802 may be used to verify that the user selected (e.g., right-clicked) on the icon for a DDL menu construct and delete the DDL menu construct at block 804 when the user selects the delete option from the context menu. Similarly, if the option to delete a DDL menu construct is invoked via the toolbar menu, block 802 may be used to verify that the user selected a DDL menu construct (e.g., the user has clicked on the DDL menu construct to delete, or the selection of the delete option from the toolbar menu brings up a list of DDL menu constructs to select for deletion).

It will be understood that multiple DDL menu constructs may be deleted at one time, for example by using a mouse to draw a box around the icons of multiple DDL menu constructs and deleting the selected DDL constructs by one of the methods described above. The delete DDL menu construct routine 800 may verify whether the user is done deleting DDL menu constructs at block 806, for example by prompting the user to confirm the DDL menu construct is to be deleted and/or prompting the user for further DDL menu construct deletions. If the user is done deleting the DDL menu construct(s) from the DDL graphical user interface, as determined at block 806, control may revert back to the editing routine 500 of FIG. 11. If not, control may return to block 802 as the delete DDL menu construct routine 800 waits for the next DDL menu construct selection to delete from the DDL graphical user interface.

Figure 15:
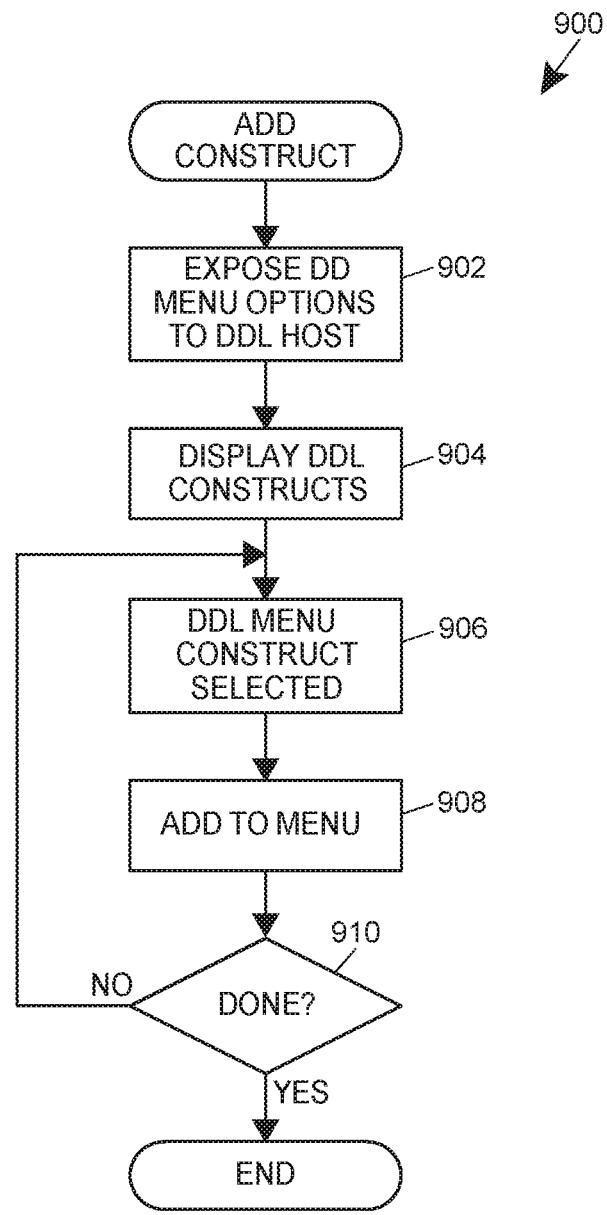
FIG. 15 is a flowchart of an exemplary DDL menu construct addition routine for adding DDL menu constructs to the DDL graphical user interface in accordance with this disclosure.

FIG. 15 is an example of an add DDL menu construct routine 900 shown at block 706 in FIG. 13 for adding a DDL menu construct to a DDL graphical user interface. If the DDL menu constructs from the DD for the device(s) retrieved when originally creating and configuring, or previously editing, the DDL graphical user interface were not already exposed at block 506 of FIG. 11 (for example, if only the DDL menu constructs in the DDL graphical user interface were exposed), the DDL menu constructs from that DD may be exposed at block 902. Similar to exposing DDL menu constructs at block 110 of FIG. 3 and at block 506 of FIG. 11, the add DDL menu construct routine 900 scans and analyzes the DD to make all DDL menu constructs available to the user through the configuration interface, such that the DDL menu constructs and values within the DD are displayed to the user.

Having exposed the DDL menu constructs at block 902, the DDL menu constructs are presented to the user in a configuration interface at block 904. The interface may be the same at that shown in FIG. 7, with the DDL constructs displayed in the menu constructs template 302. Once the DDL menu constructs are exposed and presented, a DDL menu construct may be selected at block 906 and added to the u DDL graphical user interface at block 908. The process for adding a DDL menu construct to the DDL graphical user interface may be the same as that at block 116 in FIG. 3 described above. For example, a user may select the graphical icon for a DDL menu construct from the menu construct template 302, drag the icon to the DDL graphical user interface in the configuration template 304 and drop the icon in any desired location within the configuration template 304. DDL conditionals may also be accounted for and utilized at block 906, where the add DDL menu construct routine 900 may revert control back at block 910 back to block 906 to satisfy the conditionals, as also described above.

If the user is done adding DDL menu constructs to the DDL graphical user interface, as determined at block 910, control may revert back to the editing routine 500 of FIG. 11. If not, control may return to block 906 as the add DDL menu construct routine 900 waits for the next DDL menu construct selection to add to the DDL graphical user interface.

Figure 16:
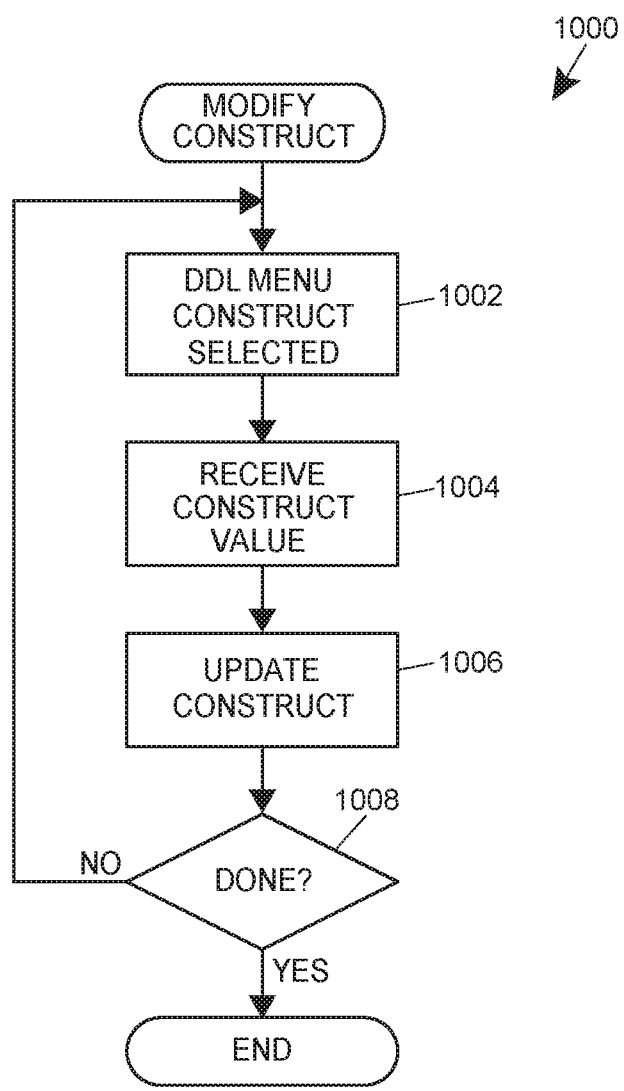
FIG. 16 is a flowchart of an exemplary DDL menu construct modification routine for modifying DDL menu constructs in the DDL graphical user interface in accordance with this disclosure.

FIG. 16 is an example of a modify DDL menu construct routine 1000 shown at block 708 in FIG. 13 for modifying a DDL menu construct in a DDL graphical user interface. Beginning at block 1002, a DDL menu construct within the DDL graphical user interface is selected. For example, the user may click on, or drag a box around, one or more graphical icons of the DDL menu constructs in the DDL graphical user interface displayed within the configuration template 304. The user may then select an option to modify a value of the selected DDL menu construct(s) via a context menu or the toolbar. Alternatively, simply selecting the DDL menu construct may constitute selection of the option to modify the DDL menu construct.

At block 1004, the new value for the DDL menu construct is received. For example, the user may enter new values for a VARIABLE, including, but not limited to, upper and lower range limits, value, data type, name, etc. Likewise, the user may enter new values for placement of the DDL menu construct within the DDL graphical user interface by dragging the icon for the selected DDL menu construct within the configuration template 304 to a desired location. Once the new value has been entered and received at block 1004, the DDL menu construct may be updated at block 1006. If the user is done modifying DDL menu constructs in the DDL graphical user interface, as determined at block 1008, control may revert back to the editing routine 500 of FIG. 11. If not, control may return to block 1002 as the modify DDL menu construct routine 1000 waits for the next DDL menu construct selection to modify in the DDL graphical user interface.

Referring again to FIG. 11, whether a DDL menu construct has been deleted, added and/or modified, or a DDL menu construct from a new device has been added to the user-configured menu, control may revert back to the editing routine 500. If the user is done modifying the DDL graphical user interface, as determined at block 516, the updated DDL graphical user interface may be saved at block 518. If not, control may return to block 508 for the next modification to the DDL graphical user interface. When the updated DDL graphical user interface is saved at block 518, the updated DDL graphical user interface is saved with the DDL-based host 50 as at block 120 of FIG. 3. In particular, the updated DDL graphical user interface is saved as FILE data with the values of chosen DDL menu constructs stored in the user database, such as that of the DDL-based host 50, as LOCAL variables, rather than being stored with the device. Again, by storing the user preferences as FILE data, DDL graphical user interface may be created and stored without having to change existing firmware, and requires no additional changes to the device itself.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

While the DDL graphical user interface configuration technique, and its elements, has been described as routines that may be implemented on a workstation or server, they may also be implemented in hardware, firmware, etc., and may be implemented by any other processor, including multiple processors. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed is:

1. A method for configuring a Device Description Language (DDL) interface on a DDL-based host system in a process plant, wherein the host system is connected to a plurality of process control devices used in the process plant, the method comprising:
    receiving, at the host system, a device description identification from a selected one of the plurality of process control devices, the device description identification identifying a device description for the selected one of the plurality of process control devices, wherein the device description comprises data and operating procedures for the selected one of the plurality of process control devices, including variables, methods, commands, menus and display formats associated with one or more features of the selected one of the plurality of process control devices;
    updating the host system with the device description identified by the received device description identification to include the data and operating procedures for the selected one of the plurality of process control devices described in the device description identified by the device description identification;
    exposing DDL menu constructs from the device description to the host system, wherein the DDL menu constructs are provided by the host system as user-selectable elements via a configuration interface; and
    adding, by the host system, one or more selected ones of the exposed DDL menu constructs to a DDL graphical user interface in response to a first input adding the selected one or more of the exposed DDL menu constructs to the DDL graphical user interface.

2. The method of claim 1, wherein adding selected ones of the exposed DDL menu constructs to the DDL graphical user interface comprises:
    mapping a selected one of the exposed DDL menu constructs to a graphical representation of the selected one of the exposed DDL menu constructs within the DDL graphical user interface.

3. The method of claim 1, wherein adding selected ones of the exposed DDL menu constructs to the DDL menu comprises:
    mapping a selected one of the exposed DDL menu constructs to a value of the selected one of the exposed DDL menu constructs within the DDL graphical user interface.

4. The method of claim 1, wherein one or more first ones of the exposed DDL menu constructs are conditional upon a second one of the exposed DDL menu constructs, the method further comprising:
    presenting, via a display device, the exposed DDL menu constructs;
    wherein adding the second selected one of the exposed DDL menu constructs to the DDL graphical user interface causes the display device to present only the one or more first ones of the exposed DDL menu constructs for subsequent selection.

5. The method of claim 1, further comprising storing the selected ones of the exposed DDL menu constructs added to the DDL graphical user interface as a DDL file data structure on the host system separate from the device description.

6. The method of claim 5, wherein the DDL file data structure maps the DDL graphical user interface to the selected ones of the exposed DDL menu constructs added to the DDL graphical user interface and is adapted to translate the selected ones of the exposed DDL menu constructs added to the DDL graphical user interface into a display of graphical representations in the DDL graphical user interface.

7. The method of claim 5, further comprising reconfiguring the DDL graphical user interface, wherein reconfiguring the DDL graphical user interface comprises:
    exposing the selected ones of the DDL menu constructs added to the DDL graphical user interface such that the selected ones of the DDL menu constructs added to the DDL graphical user interface are provided by the host system as user-selectable elements via the configuration interface; and
    deleting, by the host system, one or more of the selected ones of the exposed DDL menu constructs from the DDL graphical user interface in response to a second input deleting the one or more of the selected ones of the exposed DDL menu constructs from the DDL graphical user interface.

8. The method of claim 5, further comprising reconfiguring the DDL graphical user interface, wherein reconfiguring the DDL graphical user interface comprises:
    exposing the selected ones of the DDL menu constructs added to the DDL graphical user interface such that the selected ones of the DDL menu constructs added to the DDL graphical user interface are provided by the host system as user-selectable elements via the configuration interface; and
    changing, by the host system, a value of one or more of the selected ones of the exposed DDL menu constructs in the DDL graphical user interface in response to a second input changing the value of the one or more of the selected ones of the exposed DDL menu constructs in the DDL graphical user interface.

9. The method of claim 5, further comprising reconfiguring the DDL graphical user interface, wherein reconfiguring the DDL graphical user interface comprises:
    receiving, at the host system, a second device description identification from a second selected one of the plurality of process control devices, the second device description identification identifying a second device description for the second selected one of the plurality of process control devices, wherein the second device description comprises data and operating procedures for the second selected one of the plurality of process control devices, including DDL menu constructs associated with the second selected one of the plurality of process control devices;

exposing the DDL menu constructs from the second device description to the host system such that the DDL menu constructs are provided by the host system as user-selectable elements via the configuration interface;

adding, by the host system, selected ones of the exposed DDL menu constructs from the second device description to the DDL graphical user interface in response to a second input adding the selected ones of the exposed DDL menu constructs from the second device description of the second selected one of the plurality of process control devices to the DDL graphical user interface.

10. A Device Description Language (DDL) graphical user interface configuration system having a DDL-based host application adapted to execute on a host system in a process plant, wherein the host system is connected to a plurality of process control devices used in the process plant, the DDL graphical user interface configuration system comprising:

a processor;

a display unit;

a database stored in a memory operatively coupled to the processor and adapted to store DDL menu constructs, wherein the DDL menu constructs are exposed from a device description, the device description comprising data and operating procedures for a process control device, including variables, methods, commands, menus and display formats associated with one or more features of the process control device;

a display application stored on a computer readable device and adapted to execute on the processor to create a display on the display unit for the DDL menu constructs stored in the database, the display including a menu constructs template that presents the DDL menu constructs and an interface configuration template that presents a DDL graphical user interface, wherein the display application is adapted to execute on the processor to enable a first input selecting different ones of the DDL menu constructs within the menu constructs template to specify a DDL menu construct to add to the DDL graphical user interface and to present a graphical element associated with the selected DDL menu construct in the interface configuration template to configure the DDL graphical user interface, wherein the DDL graphical user interface is maintained by the host system.

11. The DDL graphical user interface configuration system of claim 10, wherein the menu constructs template includes a navigation tree having a plurality of folders specifying different groups of the DDL menu constructs, wherein the display application is adapted to execute on the processor to enable a second input selecting different ones of the folders within the navigational tree to specify groups of DDL menu constructs to be displayed, and to present the DDL menu constructs associated with a selected folder in the menu constructs template.

12. The DDL graphical user interface configuration system of claim 10, wherein one or more first DDL menu constructs are dependent upon a second DDL menu construct, wherein the display application is adapted to execute on the processor to present only the one or more first DDL menu constructs in the menu constructs template for selection in response to an input selecting the second DDL menu construct and adapted to enable a second input selecting only the first DDL menu constructs to add to the DDL graphical user interface.

13. The DDL graphical user interface configuration system of claim 10, wherein the DDL graphical user interface is maintained by the host system as a DDL file data structure.

14. The DDL graphical user interface configuration system of claim 13, wherein the DDL file data structure maps the DDL graphical user interface to the selected different ones of the DDL menu constructs added to the DDL graphical user interface and is adapted to translate the selected different ones of the DDL menu constructs added to the DDL graphical user interface into a display of graphical representations in the DDL graphical user interface.

15. The DDL graphical user interface configuration system of claim 10, wherein the display includes a process control device template that presents graphical representations of the plurality of process control devices, and wherein the display application is adapted to execute on the processor to enable a second input to select different ones of the process control devices, and to present the DDL menu constructs associated with the selected ones of the process control devices in the menu constructs template.

16. The DDL graphical user interface configuration system of claim 15, wherein the display application is adapted to execute on the processor to enable a third input selecting a first DDL menu construct associated with a first selected one of the process control devices to add to the DDL graphical user interface and to present a graphical element associated with the first selected DDL menu construct in the interface configuration template to configure the DDL graphical user interface, and wherein the display application is adapted to execute on the processor to enable a fourth input selecting a second DDL menu construct associated with a second selected one of the process control devices to add to the DDL graphical user interface and to present a graphical element associated with the second selected DDL menu construct in the interface configuration template to configure the DDL graphical user interface.

17. The DDL graphical user interface configuration system of claim 10, further comprising:

a DDL graphical user interface configuration application stored on a computer readable device and adapted to execute on the processor to receive a device description identification from a selected one of a plurality of process control devices, wherein the device description identification identifies the device description for the selected one of the plurality of process control devices, the DDL graphical user interface configuration application further adapted to execute on the processor to update the host system with the device description identified by the received device description identification and to expose DDL menu constructs from the device description to the host system.

18. The DDL graphical user interface configuration system of claim 17, wherein the DDL graphical user interface configuration application is adapted to execute on the processor to map a selected one of the exposed DDL menu constructs to a graphical representation of the selected one of the exposed DDL menu constructs within the DDL graphical user interface.

19. The DDL graphical user interface configuration system of claim 17, wherein the DDL graphical user interface configuration application is adapted to execute on the processor to map a selected one of the exposed DDL menu constructs to a value of the selected one of the exposed DDL menu constructs within the DDL graphical user interface.

20. The DDL graphical user interface configuration system of claim 17, wherein the DDL graphical user interface configuration application is adapted to map the DDL graphical user interface to the selected different ones of the exposed DDL menu constructs added to the DDL graphical user interface and is adapted to translate the selected different ones of the exposed DDL menu constructs added to the DDL graphical user interface into a display of graphical representations in the DDL graphical user interface.

21. The DDL graphical user interface configuration system of claim 10, further comprising:
a DDL graphical user interface editing application stored on a computer readable device and adapted to execute on the processor to expose the selected ones of the DDL menu constructs added to the DDL graphical user interface, wherein the selected ones of the exposed DDL menu constructs added to the DDL graphical user interface are provided by the host system as user-selectable elements via the interface configuration template, the DDL graphical user interface editing application further adapted to execute on the processor to enable a second input deleting one or more of the selected ones of the exposed DDL menu constructs from the DDL graphical user interface, and to delete the one or more of the selected ones of the exposed DDL menu constructs from the DDL graphical user interface in response to a second input deleting the one or more of the selected ones of the exposed DDL menu constructs from the DDL graphical user interface.

22. The DDL graphical user interface configuration system of claim 10, further comprising:
a DDL graphical user interface editing application stored on a computer readable device and adapted to execute on the processor to expose the selected ones of the DDL menu constructs added to the DDL graphical user interface, wherein the selected ones of the exposed DDL menu constructs added to the DDL graphical user interface are provided by the host system as user-selectable elements via the interface configuration template, the DDL graphical user interface editing application further adapted to execute on the processor to enable a second input changing a value of one or more of the selected ones of the exposed DDL menu constructs in the DDL graphical user interface, and to change the value of the one or more of the selected ones of the exposed DDL menu constructs in the DDL graphical user interface in response to a second input changing the value of the one or more of the selected ones of the exposed DDL menu constructs in the DDL graphical user interface.

23. The DDL graphical user interface configuration system of claim 10, further comprising:
a DDL graphical user interface editing application stored on a computer readable device and adapted to execute on the processor to receive a second device description identification from a second selected one of the plurality of process control devices, the second device description identification identifying a second device description for the second selected one of the plurality of process control devices, wherein the second device description comprises data and operating procedures for the second selected one of the plurality of process control devices, including DDL menu constructs associated with the second selected one of the plurality of process control devices,
the DDL graphical user interface editing application further adapted to expose the DDL menu constructs from the second device description to the host system, wherein the DDL menu constructs from the second device description are provided by the host system as user-selectable elements via the menu constructs template, the DDL graphical user interface editing application further adapted to enable a second input to add selected ones of the exposed DDL menu constructs from the second device description to the DDL graphical user interface, and to add the selected ones of the exposed DDL menu constructs from the second device description to the DDL graphical user interface in response to a second input adding the selected ones of the exposed DDL menu constructs from the second device description to the DDL graphical user interface.

24. A method for configuring a Device Description Language (DDL) menu on a DDL-based host system in a process plant, wherein the host system is connected to a plurality of process control devices used in the process plant, the method comprising:
presenting a menu constructs template including graphical representations of a plurality of DDL menu constructs for a selected one of the plurality of process control devices, and enabling a first input requesting a selected one of the DDL menu constructs, wherein the DDL menu constructs are exposed to the host system from a device description for the selected one of the plurality of process control devices, the device description comprising data and operating procedures for the selected one of the plurality of process control devices, including variables, methods, commands, menus and display formats associated with one or more features of the selected one of the plurality of process control devices;
in response to a first input selecting one of the DDL menu constructs, presenting an interface configuration template including a graphical representation of a DDL graphical user interface and the graphical representation of the selected one of the DDL menu constructs, and enabling a second input configuring the selected one of the DDL menu constructs within the DDL graphical user interface; and
in response to a second input configuring the selected one of the DDL menu constructs within the DDL graphical user interface, enabling the first input requesting a selected one of the DDL menu constructs and enabling a third input storing the DDL graphical user interface including the configured DDL menu construct as a DDL file data structure on the host system separate from the device description.

25. The method of claim 24, further comprising:
presenting a menu styles template including representations of DDL menu styles for the selected one of the plurality of process control devices and enabling a fourth input requesting a selected one of the DDL menu styles; and
in response to a fourth input selecting a DDL menu style, presenting the interface configuration template including a graphical representation of the DDL graphical user interface and the graphical representation of the selected one of the DDL menu styles.

26. The method of claim 24, further comprising:
presenting a process control device template including representations of the plurality of process control devices and enabling a fourth input requesting a selected one of the plurality of process control devices; and in response to a fourth input selecting one of the plurality of process control devices, presenting the menu constructs template.

27. The method of claim 26, further comprising:
in response to a fourth input selecting one of the plurality of process control devices,
retrieving a device description identification from the selected one of the plurality of process control devices, the device description identification identifying the device description for the selected one of the plurality of process control devices;
updating the host system with the device description identified by the received device description identification to include the data and operating procedures for the selected one of the plurality of process control devices described in the device description identified by the device description identification; and
exposing DDL menu constructs from the device description to the host system.

28. The method of claim 24, further comprising:
in response to a first input selecting a DDL menu construct, determining if one or more of the plurality of DDL menu constructs is dependent upon the selected one of the DDL menu constructs;
in response to a determination that one or more of the plurality of DDL menu constructs is dependent upon the selected one of the DDL menu constructs, presenting the menu constructs template including only the graphical representations of the dependent DDL menu constructs as selectable options and enabling a fourth input requesting a selected one of the dependent DDL menu constructs; and
in response to a fourth input selecting a dependent DDL menu construct, presenting the interface configuration template including a graphical representation of the selected one of the dependent DDL menu constructs, and enabling a fifth input configuring the selected one of the dependent DDL menu constructs within the DDL graphical user interface.

29. The method of claim 28, further comprising:
in response to a determination that one or more of the plurality of DDL menu constructs is dependent upon the selected one of the DDL menu constructs, disabling the third input storing the DDL graphical user interface; and
in response to a fourth input selecting a dependent DDL menu construct, enabling the third input storing the DDL graphical user interface.

30. The method of claim 28, further comprising:
in response to a determination that one or more of the plurality of DDL menu constructs is dependent upon the selected one of the DDL menu constructs, enabling a sixth input requesting no selection one of the dependent DDL menu constructs; and
in response to a sixth input to not select a dependent DDL menu construct, presenting the menu constructs template including graphical representations of the plurality of DDL menu constructs for the selected one of the plurality of process control devices, and enabling the first input requesting a selected one of the DDL menu constructs.

31. The method of claim 28, wherein a DDL menu construct is dependent upon another DDL menu construct based upon a DDL conditional, wherein a DDL conditional dictates the relationship between one DDL menu construct and another DDL menu construct.

32. The method of claim 24, wherein the plurality of DDL menu constructs for the selected one of the plurality of process control devices comprises a first plurality of DDL menu constructs for the selected one of the plurality of process control devices, the method further comprising:
in response to a first input selecting a DDL menu construct from the first plurality of DDL menu constructs, presenting the menu constructs template including graphical representations of a second plurality of DDL menu constructs for the selected one of the plurality of process control devices and enabling a fourth input requesting a selected one of the second plurality of DDL menu constructs; and
in response to a fourth input selecting one of the second plurality of DDL menu constructs, presenting the interface configuration template including a graphical representation of the selected one of the second plurality of DDL menu constructs, and enabling a fifth input configuring the selected one of the second plurality of DDL menu constructs within the DDL graphical user interface.

33. The method of claim 24, further comprising:
in response to a fourth input selecting a graphical representation of a DDL menu construct presented in the interface configuration template, enabling, deleting the selected DDL menu construct from the DDL graphical user interface and presenting the interface configuration template including the graphical representation of the DDL graphical user interface without the graphical representation of the deleted DDL menu construct.

34. The method of claim 24, further comprising:
in response to a fourth input selecting a graphical representation of a DDL menu construct presented in the interface configuration template, enabling a fifth input changing the value of the selected graphical representation of the DDL menu construct; and
in response to a fifth input changing the value of the DDL menu construct in the DDL graphical user interface, changing the value of the DDL menu construct in the DDL graphical user interface.

35. The method of claim 24, further comprising:
presenting the menu constructs template including graphical representations of a plurality of second DDL menu constructs for a second selected one of the plurality of process control devices, and enabling a fourth input requesting a selected one of the second DDL menu constructs, wherein the second DDL menu constructs are exposed to the host system from a device description for the selected second one of the plurality of process control devices, the device description comprising data and operating procedures for the selected second one of the plurality of process control devices, including variables, methods, commands, menus or display formats associated with one or more features of the selected one of the plurality of process control devices;
in response to a fourth input selecting one of the second DDL menu constructs, presenting the interface configuration template including a graphical representation of the selected one of the second DDL menu constructs, and enabling a fifth input configuring the selected one of the second DDL menu constructs within the DDL graphical user interface.

* * * * *